(12) United States Patent
Kato et al.

(10) Patent No.: US 6,266,085 B1
(45) Date of Patent: *Jul. 24, 2001

(54) CAMERA IMAGING AND MAGNIFICATION DEVICE

(75) Inventors: Eiji Kato; Tomoaki Kawai, both of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/558,424

(22) Filed: Nov. 16, 1995

(30) Foreign Application Priority Data

Nov. 17, 1994 (JP) .................................................. 6-308230
Nov. 28, 1994 (JP) .................................................. 6-292526
Apr. 6, 1995 (JP) .................................................. 7-081000

(51) Int. Cl.$^7$ .................................................. H04N 5/232
(52) U.S. Cl. .................... 348/211; 348/333.05; 348/143
(58) Field of Search ...................................... 348/207, 211, 348/212, 213, 333, 334, 358, 15, 16, 39, 143, 169, 705, 706, 47, 48, 50, 18; H04N 5/225

(56) References Cited

U.S. PATENT DOCUMENTS

| | | | |
|---|---|---|---|
| 5,185,667 | * 2/1993 | Zimmermann | 348/207 |
| 5,396,287 | * 3/1995 | Cho | 348/211 |
| 5,426,732 | * 6/1995 | Boies et al. | 348/143 |
| 5,479,206 | * 12/1995 | Ueno et al. | 348/213 |
| 5,570,177 | * 10/1996 | Parker et al. | 348/213 |
| 5,589,878 | * 12/1996 | Cortjens et al. | 348/211 |
| 5,757,418 | * 5/1998 | Inagaki et al. | 348/15 |

FOREIGN PATENT DOCUMENTS

| | | |
|---|---|---|
| 3933926 | 2/1991 | (DE) . |
| 4428510 | 2/1995 | (DE) . |
| 604009 | 6/1994 | (EP) . |
| 2693868 | 1/1994 | (FR) . |
| 2249897 | 5/1992 | (GB) . |
| 2259211 | 3/1993 | (GB) . |
| 2273410 | 6/1994 | (GB) . |
| WO-9417636 | 8/1994 | (WO) . |
| WO-9511566 | 4/1995 | (WO) . |

OTHER PUBLICATIONS

European Search Report in application No. EP 95 30 8227, dated Feb. 28, 1996, citing to the references listed herein.

* cited by examiner

*Primary Examiner*—Tuan Ho
(74) *Attorney, Agent, or Firm*—Morgan & Finnegan, LLP

(57) ABSTRACT

A first frame indicating a maximum imaging visual field when a camera is panned and tilted to the respective limits is displayed on a display screen. A second frame indicative of a current imaging range is displayed at a position in the first frame which corresponds to the current imaging conditions (panning, tilting, and zooming). Panning and tilting are designated by an operation of moving the second frame, and zooming is designated by an operation of enlarging or reducing the second frame. In this way panning, tilting, and zooming of the camera are controlled in accordance with the position and the size of the second frame in the first frame. It is preferable that an image in the maximum imaging visual field be previously taken and displayed in the first frame.

44 Claims, 20 Drawing Sheets

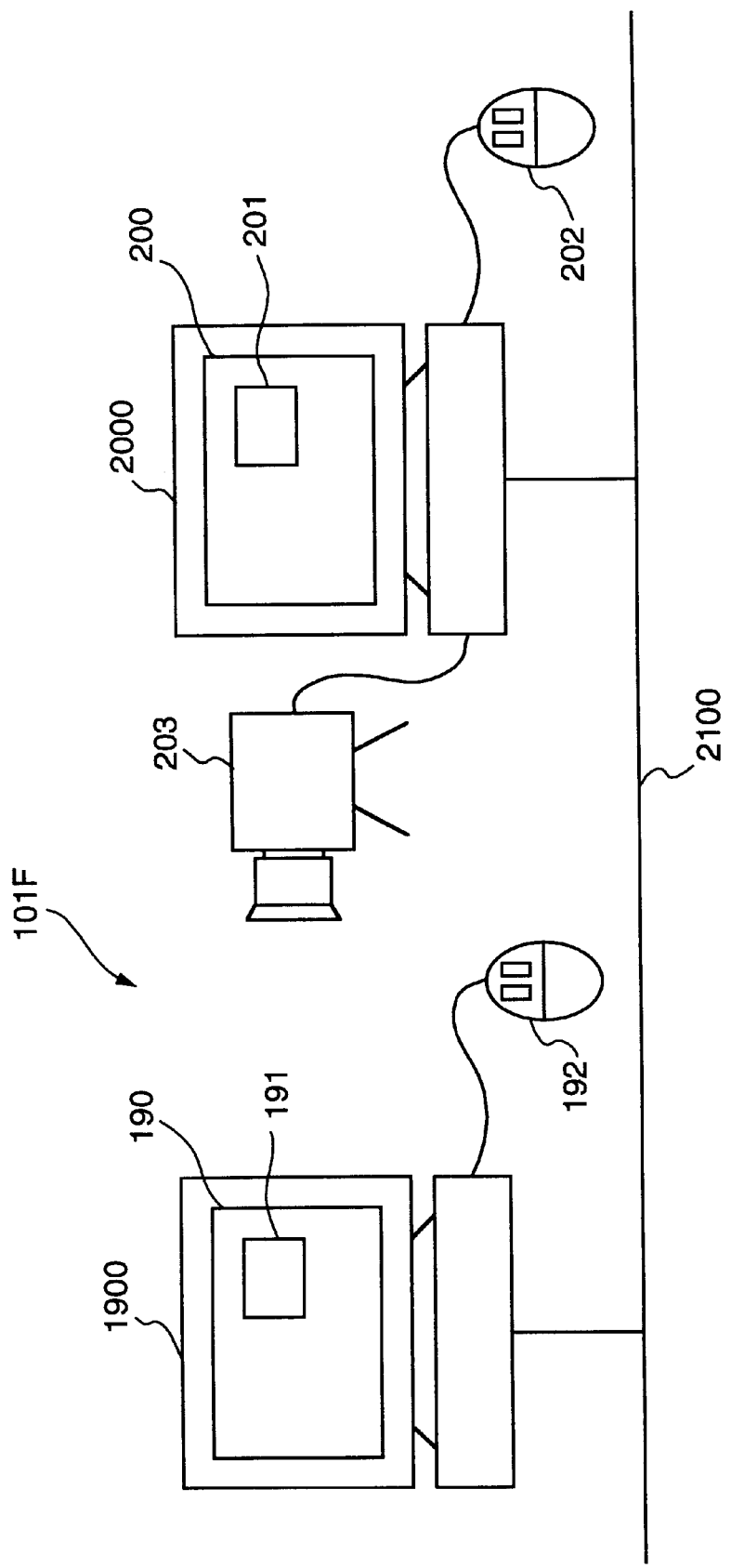

CAMERA IMAGING AND MAGNIFICATION DEVICE

BACKGROUND OF THE INVENTION

The present invention relates to a camera control device and, more particularly, to a camera control device for controlling the imaging (photographing) direction (panning and/or tilting) and the magnification (zooming).

Conventional means for remotely controlling the panning and/or tilting and zooming of a video camera include an operation lever, a joy stick, and a push button switch, each of which corresponds to rotations on two axes, and a button on a display which imitates any of these devices. When these devices are used, the rotational angle or the angular velocity is made correspond to the angle of the lever, or a rotation in a desired direction, such as a vertical or horizontal direction, is performed while the button is pushed. Analogously, zoom control is done by using a button or the like device which designates an operation to the wide-angle side or the telephoto side.

When, for example, panning or tilting is performed using the camera operating means or control device as described above, the camera pans or tilts in accordance with the operation, so the device is suitable for an operation which the user performs while monitoring the monitor screen. However, the device is inappropriate to operate or control a camera to a target position regardless of the current camera position.

Another method is possible in which the angles of a panning and tilting are directly input as numerical values and a camera is moved to the corresponding position under the control of a control device. In this case, however, an operator cannot sensibly recognize which region in the movable range of panning/tilting is within the field of view.

In remote diagnoses or television conference systems in which the circumstances of remote places need to be picked up by television cameras, an object to be picked up moves or objects are changed in many instances while a motion image is taken from a video camera and displayed on a display. In these cases, a user on the camera side need not always confirm the picking up range by directly monitoring the motion image on the display, since the user can identify the picked up object to some extent by checking the direction of the camera. However, if the camera is located in a remote place from both the display and the user, the user must change an object to be picked up by remotely changing the direction of the camera while monitoring the screen on which the motion image currently being picked up is displayed.

In these instances, the direction of the camera can be controlled more easily if the user can see not only a motion image within the limited range which can be picked up by the camera at once but also the circumstances over a wide area in the remote place capable of being picked up by the camera. Additionally, the presence is improved and the atmosphere is better understood when not only an object of interest but the scene in an entire remote place are displayed on the screen.

The circumstances over a broader range in a remote place cannot be communicated by motion images unless motion images taken by a wide-angle camera are displayed. Unfortunately, when the atmosphere is communicated by using wide-angle motion images, an object of interest also is displayed as a small image.

Methods by which this is prevented are to selectively display an image of an entire atmosphere (wide-angle) and an enlarged image (standard or telephoto) on a single display (or display window), and to simultaneously display two images taken by wide-angle and standard (or telephoto) cameras on two displays (or display windows). It is unfortunate that transmitting wide-angle and standard images using two cameras requires pairs of cameras, camera control devices, and image transmission lines.

To realize this with a single camera, the following methods are possible.

(1) Transmit a high-resolution motion image and display the image on a high-resolution, large screen.

(2) Transmit a high-resolution motion image and enlarge, where necessary, only an object of interest on the display side.

(3) Transmit a motion image with a normal pixel density and enlarge a portion of the image on the display side.

(4) Change the zoom ratio of a camera in a remote place.

In methods (1) and (2) described above, however, it is necessary to transmit motion images with a high definition (=large capacity). Consequently, in method (2) the image quality is degraded when an image is displayed in an enlarged scale. Also, in the methods other than method (1) it is not possible to simultaneously check the motion image over a wide area and the point of interest, i.e., two different images of wide-angle and standard ranges.

SUMMARY OF THE INVENTION

It is a principal object of the present invention to provide a camera control device and method which solve the above conventional problems.

That is, it is an object of the present invention to provide a camera control device capable of simply and rapidly controlling a camera to a target state regardless of the current camera condition.

It is another object of the present invention to provide a camera control device capable of clearly presenting to an operator a imaging visual field obtained by the control to the target state.

A camera control device according to the present invention is a camera control device for controlling a camera capable of at least panning and tilting, comprising display means for displaying a first frame which indicates a potential maximum imaging visual field defined by limits of panning and tilting, and a second frame which indicates a current imaging range at a position inside the first frame and corresponding to current imaging conditions. This camera control device further comprises operating means for operating the second frame displayed on the display means, and control means for controlling the camera in accordance with the position of the second frame operated by the operating means.

The above camera control device preferably further comprises means for inputting an image in the maximum imaging visual field while moving the camera within the limits of panning and tilting at a predetermined timing, and displaying the input image in the first frame. The predetermined timing is, for example, when camera control is started, when an operator inputs a specific instruction, and/or when a camera operation input is determined.

Furthermore, the camera comprises an externally controllable zoom function, and the display means displays a first frame which indicates a potential maximum imaging visual field defined by the limits of panning and tilting and a wide-angle end of zooming, and a second frame which indicates a current imaging range inside the first frame and having a position and a size corresponding to current panning, tilting, and zooming conditions.

Alternatively, a camera operation area is set inside and/or in the vicinity of the second frame displayed on the display means and operated by operating means consisting of a pointing device such as a mouse, thereby updating the display of the second frame and controlling the camera.

By the use of the above means, an operator can intuitively recognize which part in a range which can be picked up by panning and tilting is currently being picked up. Also, the direction and zoom of the camera are controlled by operating the second frame for displaying the current imaging range, so the camera can be directly aimed in a direction of interest. These functions greatly improve the operability of the camera.

Furthermore, when an object to be picked up in the maximum imaging visual field is previously picked up and displayed in the first frame, an operator can select a portion which he or she intends to image more properly and can control the camera in the corresponding direction and to the corresponding zoom value.

It is still another object of the present invention to provide a motion image display apparatus capable of communicating the circumstances over a wide area in a remote place by transmitting a portion of interest as a motion image and the other portion as a still image, and also capable of efficiently displaying the motion image.

To achieve this object, a motion image display apparatus of the present invention comprises motion image inputting means for inputting a motion image, imaging direction changing means for changing an imaging direction of the motion image inputting means, synthesizing means for synthesizing one still image in a wide area on the basis of motion images in various directions previously taken by changing the imaging direction of the motion image imaging means, display means for displaying the still image synthesized by the synthesizing means in a still image area, and displaying a motion image currently being taken by the motion image inputting means in a motion image area superposed on a position corresponding to a current imaging direction in the still image area, motion image area moving means for moving the motion image area within the still image area, and control means for controlling the imaging direction changing means on the basis of position information of the motion image area moved by the motion image area moving means so that the imaging direction of the motion image imaging means corresponds to the position of the moved motion image area, and updating a portion of the synthetic still image corresponding to the motion image area before being moved, as a still image, by using the motion image displayed in the motion image area before the imaging direction is moved.

In this arrangement, when the motion image area moving means moves the motion image area, the control means controls the imaging direction changing means on the basis of the position information of the moved motion image area so that the imaging direction of the motion image imaging means corresponds to the position of the moved motion image area. The control means also updates a portion of the synthetic still image corresponding to the motion image area before being moved, as a still image, by using the motion image displayed in the motion image area before the imaging direction is changed. Accordingly, even if motion image display processing on a large screen is slow or a motion image in a wide area is difficult to display with a high definition because the motion image transfer rate is not so high, an image over a wide area which communicates an overall atmosphere is displayed as a still image, and a portion of interest is displayed as a motion image. Additionally, since the still and motion images are displayed by synthesizing them while their positions and sizes are matched as if a portion of the still image is replaced with the motion image, an efficient motion image display is possible with little computer resources. Also, not the whole synthetic still image but only the portion of interest is updated, so only a small data amount needs to be updated.

In the above apparatus, the whole synthetic still image can be periodically updated by scanning a imaging area corresponding to the still image area by using the motion image imaging means.

Also, in the motion image display apparatus, the whole synthetic still image can be updated by scanning a imaging area corresponding to the still image area by using the motion image imaging means, while a motion detecting means is not detecting a motion of an object.

Other features and advantages of the present invention will become apparent from the following description taken in conjunction with the accompanying drawings, in which like reference characters designate the same or similar parts throughout the figures thereof.

BRIEF DESCRIPTION OF THE DRAWINGS

FIG. 20 is a block diagram of the tenth embodiment.

DETAILED DESCRIPTION OF THE PREFERRED EMBODIMENTS

Embodiments of the present invention will be described in detail below with reference to the accompanying drawings.

FIRST EMBODIMENT

Figure 1:
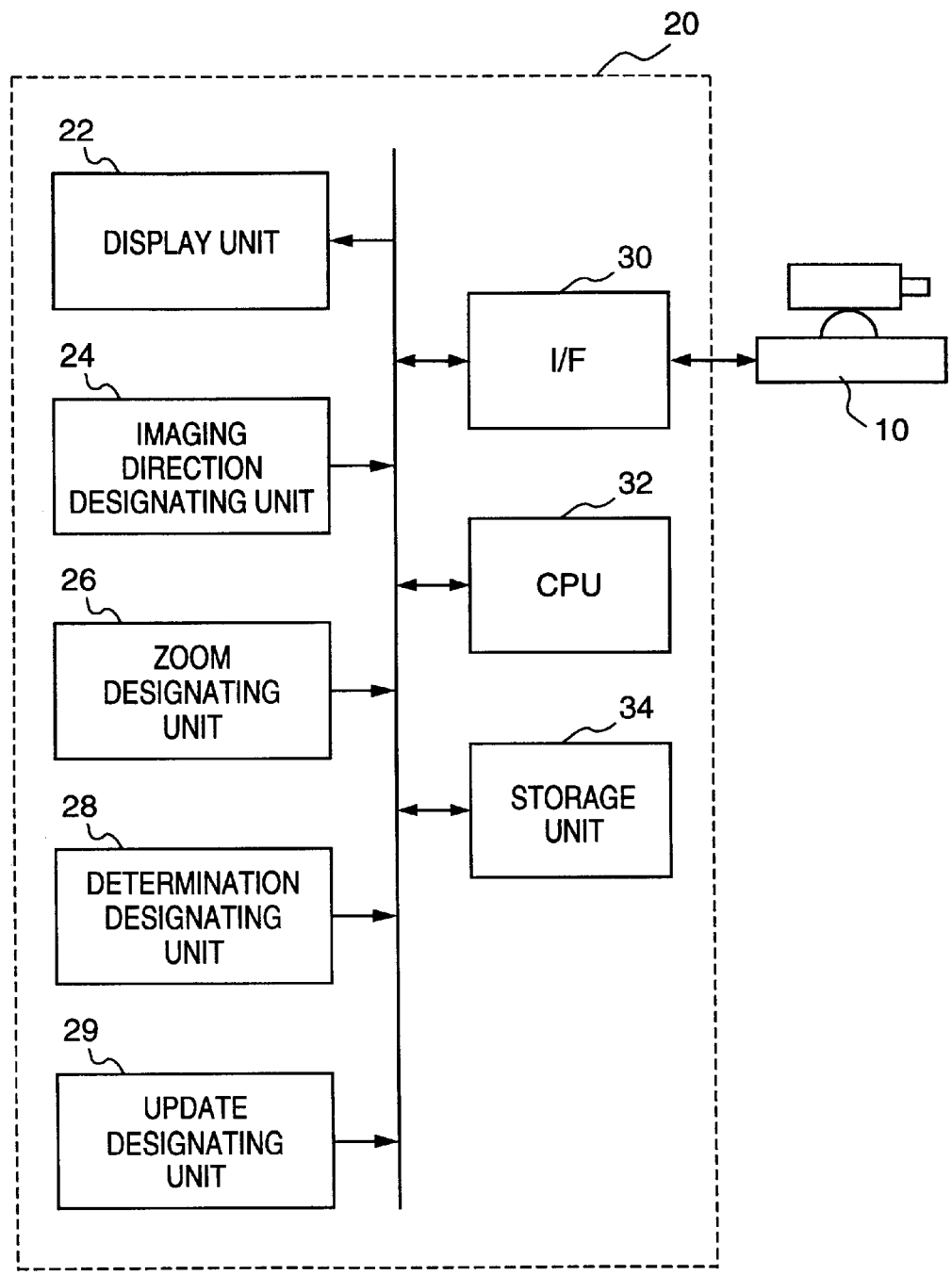
FIG. 1 is a block diagram of one embodiment of the present invention.

FIG. 1 is a block diagram schematically showing the configuration of the first embodiment of the present invention. In FIG. 1, reference numeral 10 denotes a video camera capable of panning and/or tilting and zooming; and 20, a camera control device according to this embodiment of the present invention, which remotely controls the video camera 10. A display unit 22 displays a potential maximum picking up range of the video camera 10 and a picking up range at the respective current values or control values of panning and/or tilting and zooming of the video camera 10. A picking up direction (orientation) designating unit 24 designates a target picking up direction. A zoom designating unit 26 designates a zoom value in the target picking up direction. A determination designating unit 28 designates determination of input of a new picking up range. An update designating unit 29 designates update of an image taken within the potential maximum picking up range. Reference numeral 30 denotes an interface with the video camera 10; 32, a CPU for controlling the entire camera control device 20; and 34, a storage unit for storing control programs and control parameters of the CPU and current values and limit values of panning, tilting, and zooming.

In the above configuration, when the video camera 10 and the camera control device 20 are turned on, the camera control device 20 transmits a predetermined reset signal to the video camera 10. Upon receiving this reset signal, the video camera 10 aims the lens toward the center of a photographing enable range defined by horizontal and vertical pivotal ranges. At this time a zoom function is set at the wide-angle end as an initial state.

Figure 2:
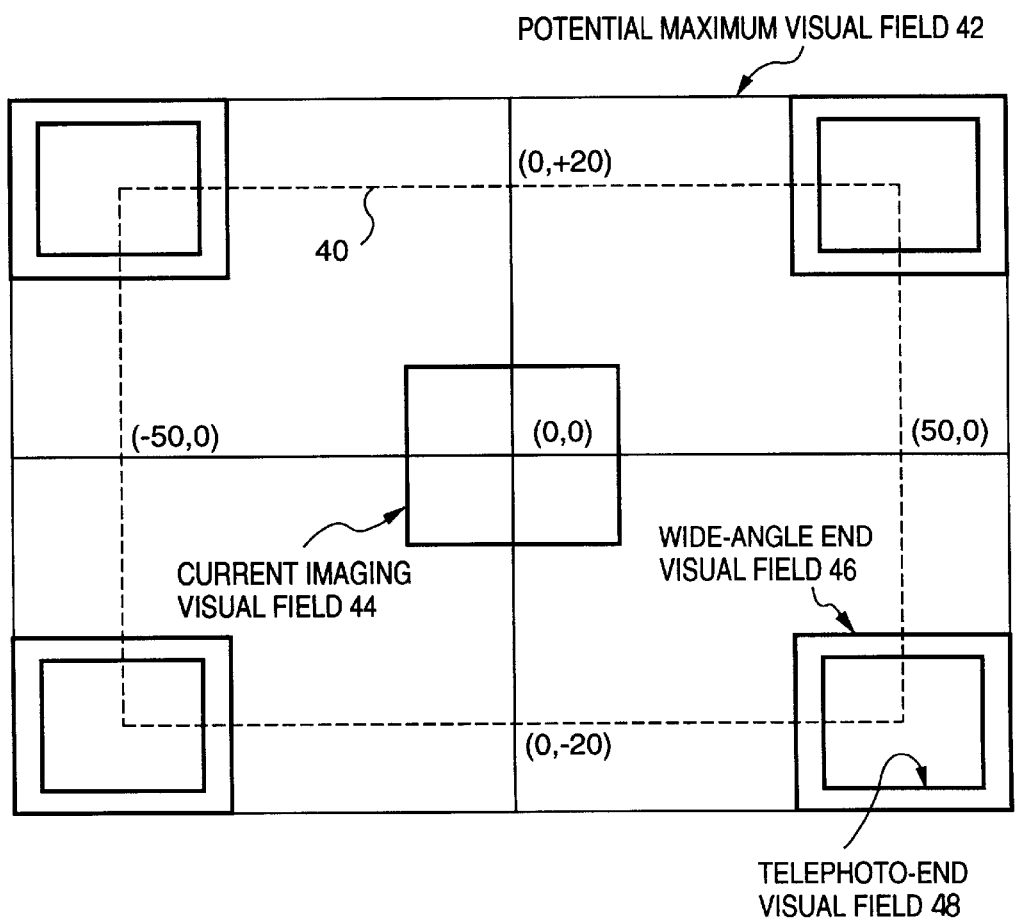
FIG. 2 is a view showing an example of the contents displayed on a display unit 22 of this embodiment.

FIG. 2 shows an example of the contents displayed on the display unit 22. The camera control device 20 of this embodiment is designed as a part of a workstation serving as a communication terminal of a television conference system. One window of the monitor screen of this workstation functions as the display unit 22.

Referring to FIG. 2, a rectangular frame 40 indicated by the dotted lines shows the position of the picking up optical axis at the limits of panning/tilting. An outer rectangular frame 42 shows the potential maximum picking up range (or visual field) connecting the outermost ends of a picking up range when the zoom ratio is controlled to the wide-angle end at the limits of panning/tilting. Note that in FIG. 2, it is assumed that a panning angle of 50° and a tilting angle of 20° are possible each with respect to the center of the field. A rectangular frame 44 indicated by the thick solid lines shows a picking up visual field at specific values (current values or control values) of panning, tilting, and zooming of the video camera 10. The picking up range at the wide-angle end when the panning angle is 50° and the tilting angle is −20° is indicated by a rectangular frame 46. The picking up range at the telephoto end under the same conditions is indicated by a rectangular frame 48.

Figure 3:
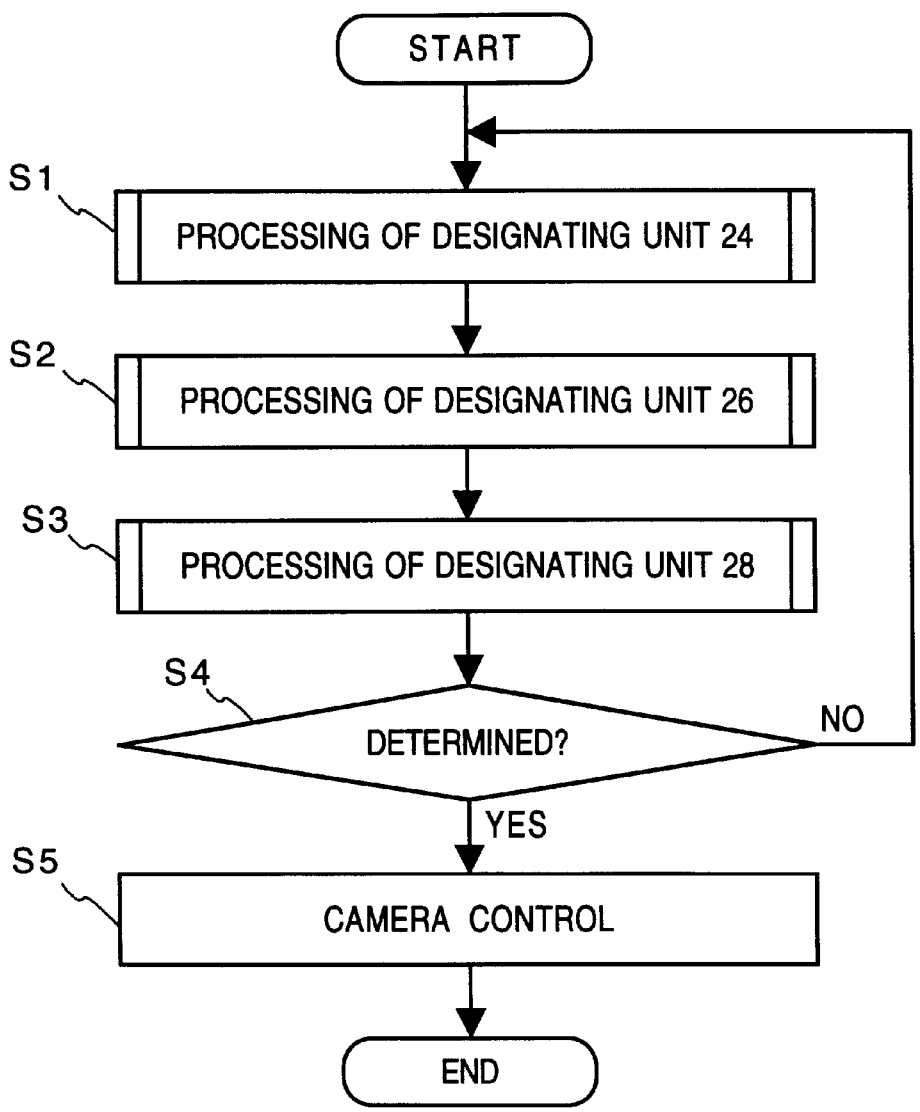
FIG. 3 is a flow chart of the main routine of this embodiment.

The operation of this embodiment will be described below with reference to FIGS. 3 to 6. FIG. 3 shows the main routine of this embodiment. This program is stored in the storage unit 34. The CPU 32 sequentially calls processing (S1) of the designating unit 24, processing (S2) of the designating unit 26, and processing (S3) of the designating unit 28. If target values of panning, tilting, and zooming are determined (S4) after the processing (S3) of the designating unit 28, the designation of a new picking up range is completed. Accordingly, the CPU 32 controls the camera 10 to a panning angle, a tilting angle, and a zoom value corresponding to the respective designated values (S5). If the target values are not determined (S4), the CPU 32 repeats steps S1, S2, and S3.

Figure 4:
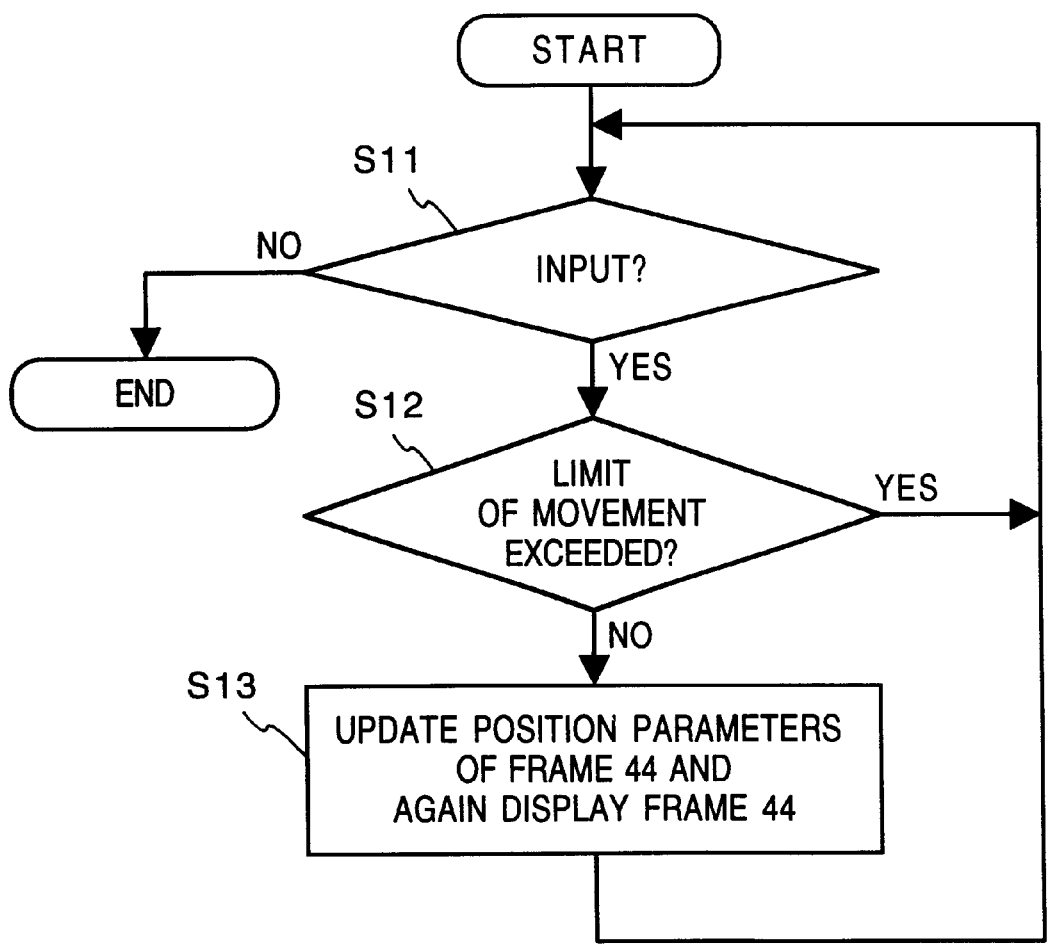
FIG. 4 is a detailed flow chart of step S1 in FIG. 3.

FIG. 4 is a detailed flow chart of step S1. In this embodiment, a pointing device such as a mouse is used as the designating unit 24. An operator moves a cursor which moves with this pointing device to the rectangular frame 44, FIG. 2, and designates a new position of the rectangular frame 44 by dragging the pointing device while pushing the button of the device. It is needless to say that the center of the rectangular frame 44 cannot move to the outside of the rectangular frame 40.

More specifically, the CPU 32 first checks in step S11 whether an input from the designating unit 24 exists. "Input" means that the mouse is moved with the mouse button depressed while the cursor is present in the rectangular frame 44. If the mouse button is not depressed, the processing in FIG. 4 is ended, and the flow advances to step S2 of the main routine, FIG. 3. If a mouse movement is detected (S11), the CPU 32 checks whether ,for example, the movement direct of the frame 44 directs of the frame 44 exceed the rectangular frame 40 which indicates the limits of panning and/or tilting (S12). If YES in step S12, the flow immediately returns to step S11. If NO in step S12, the CPU 32 updates the values of panning and tilting angles stored in the storage unit 34 to values corresponding to.the new position of the rectangular frame 44 and again displays the rectangular frame 44 at the new position on the screen of the display unit 22 (S13).

Figure 5:
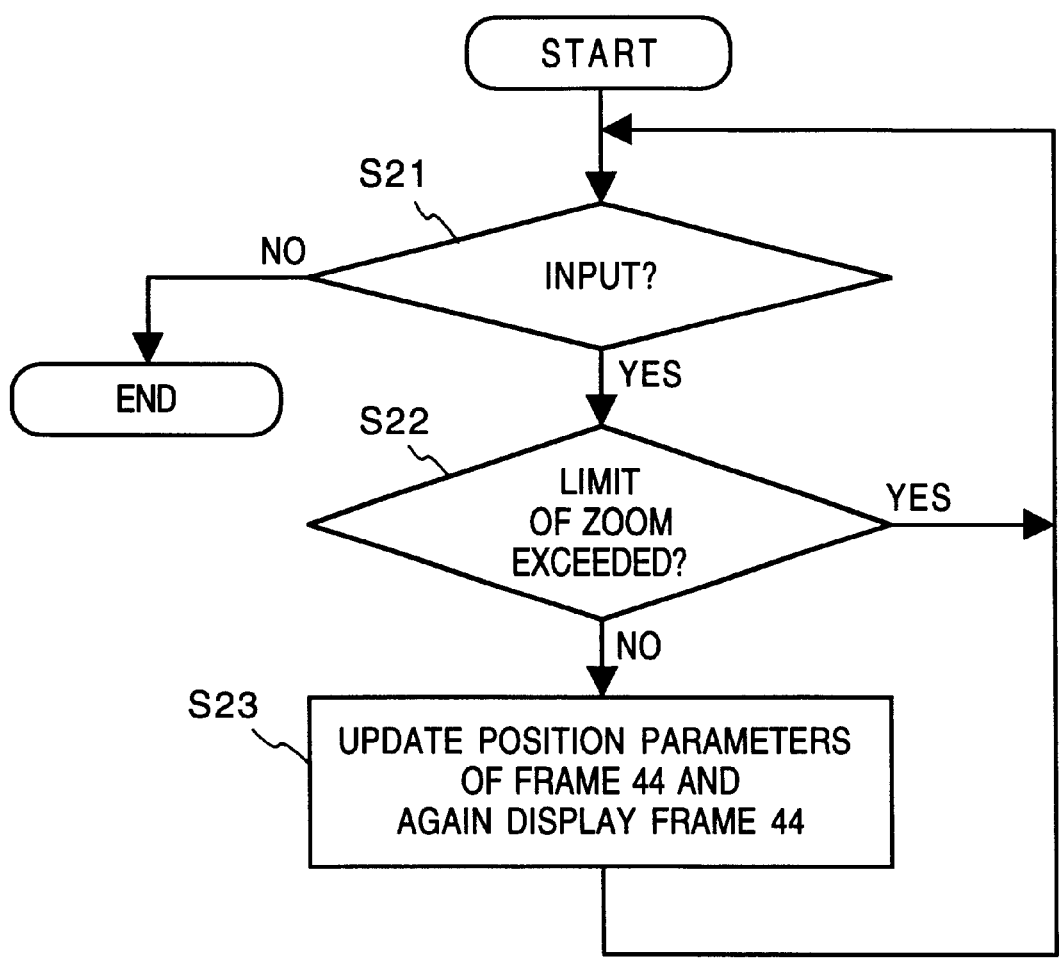
FIG. 5 is a detailed flow chart of step S2 in FIG. 3.

FIG. 5 is a detailed flow chart of step S2. In this embodiment, a specific key (e.g., a key assigned to up/down of zooming) provided on a keyboard (not shown) or a similar button on a graphical user interface is used as the zoom designating unit 26.

The CPU 32 checks whether an input from the designating unit 26 exists (S21). If NO in step S21, the processing in FIG. 5 is ended, and the flow advances to S3 of the main routine, FIG. 3. If YES in step S21, the CPU 32 checks whether the limit of zooming is exceeded (S22). If YES in step S22, the flow immediately returns to step S21. If NO in step S22, the CPU 32 updates the zoom value stored in the storage unit 34 to a new value corresponding to the input from the designating unit 26 and again displays the rectangular frame 44 with a size corresponding to the new zoom value on the screen of the display unit 22 (S23). The central position of the rectangular frame 44 does not move.

Figure 6:
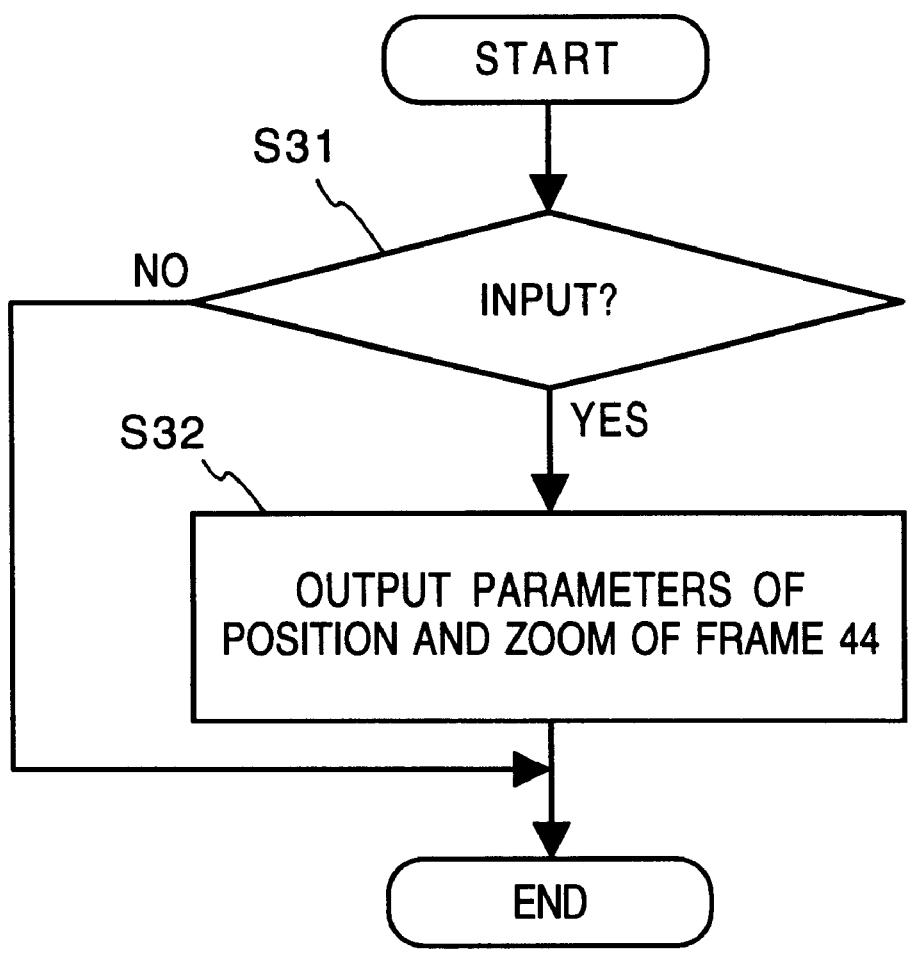
FIG. 6 is a detailed flow chart of step S3 in FIG. 3.

FIG. 6 is a detailed flow chart of step S3. In this embodiment, a specific key (e.g., an ENTER key) or a similar button on the graphical user interface is used as the designating unit 28. The CPU 32 checks whether an input exists (S31). If NO in step S31, the CPU 32 immediately ends the processing. If YES in step S31, the CPU 32 outputs the values of panning and tilting parameters and the value of a zooming parameter for the rectangular frame 44, stored in the storage unit 34, in order to perform other processing, and ends the processing (S32).

When the designation for determination is thus input, the CPU 32 controls the camera 10 in accordance with the set information (S5).

In this embodiment, the main routine sequentially checks inputs from the designating units 24, 26, and 28 by polling. However, the processing activities by these designating units 24, 26, and 28 can be interrupt processings or implemented as "call back" procedures activated from the graphical user interface.

Also, in this embodiment a specific key input is set as the designating unit 26. However, a pointing device such as a mouse also can be used as the designating unit 26. In this case, as is found in plotting software, a specific control point is provided on the frame 44, and zooming is designated by moving this control point. Furthermore, as is also found in plotting software, panning, tilting, and zooming can be simultaneously designated by the use of an operation of moving and enlarging or reducing the frame 44.

In this embodiment, the camera 10 is controlled in accordance with determination of a new designation of the rectangular frame 44 (step S5, FIG. 3). However, if any of panning/tilting and zooming is changed it is also possible to immediately control the camera 10 to the corresponding control value. That is, real-time control is possible if the speeds of panning, tilting, and zooming of the camera 10 are sufficiently high. Also, these two control methods can of course be selectively set as an operation mode.

Figure 9:
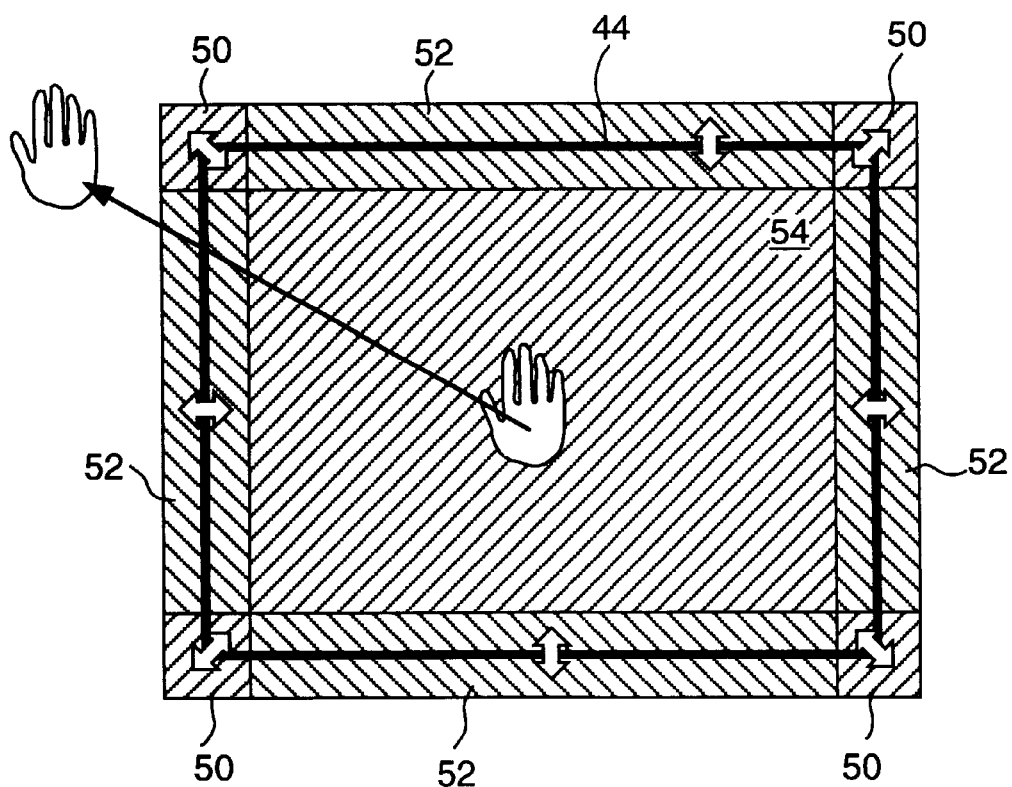
FIG. 9 is a view for explaining an arrangement in which GUI for panning, tilting, and zooming operations is set on a rectangular frame 44.

An example of an operation of panning, tilting, and zooming will be briefly described below. In the rectangular frame 44 (FIG. 2) defining the current picking up visual field, three types of areas 50, 52, and 54 differently hatched in FIG. 9 are set as operation areas for panning, tilting, and zooming. That is, the areas 50 are set at the four corners of the rectangular frame 44. The areas 52 are oblong areas extending along the four sides of the rectangular frame 44. The area 54 is defined inside the areas 50 and 52.

The area 54 is used to perform panning and tilting. When moved inside the area 54, the mouse cursor assumes a shape (the shape of an open hand in FIG. 9) which indicates that a panning/tilting operation is started. When an operator drags the mouse in this state while depressing the mouse button, in accordance with the drag the CPU 32 updates the rectangular frame 44 to a position moved in the corresponding moving direction by the corresponding moving amount, and at the same time pans and tilts the camera 10 by the corresponding angles. FIG. 9 shows an example in which the mouse cursor is moved up to the left. As is well known, the drag operation is completed when the mouse button is released, and the panning/tilting operation also is completed. If the performance of the camera control device 20 is high, the camera 10 can be rotated following the drag operation. If the performance is low, during the drag operation only the rectangular frame 44 is updated without controlling the camera 10, and the camera 10 is rotated after the drag operation is completed.

The areas 50 and 52 are used to perform zooming. When moved inside the area 50 or 52, the mouse cursor assumes a shape (the shape of a bidirectional arrow in FIG. 9, which implies enlargement or reduction of the rectangular frame 44) indicating that a zoom operation is started. When an operator drags the mouse in this state while depressing the mouse button, the CPU 32 updates the rectangular frame 44 to a size corresponding to the outward or inward moving amount while maintaining the aspect ratio of the frame, and at the same time controls the camera 10 to the corresponding zoom value. The drag operation is completed when the mouse button is released, and the zoom operation also is completed. It is preferable that a user can arbitrarily set a portion which is fixed when the size of the rectangular frame 44 is changed. Examples are the method in which a side or a corner opposing a side or a corner at which the mouse cursor is placed is fixed and the method in which the center of the rectangular frame 44 is fixed. In this zoom operation, as in the panning/tilting operation described above, whether zoom control of the camera 10 is to be performed following the drag operation depends upon the performance of the camera control device 20.

SECOND EMBODIMENT

Figure 7:
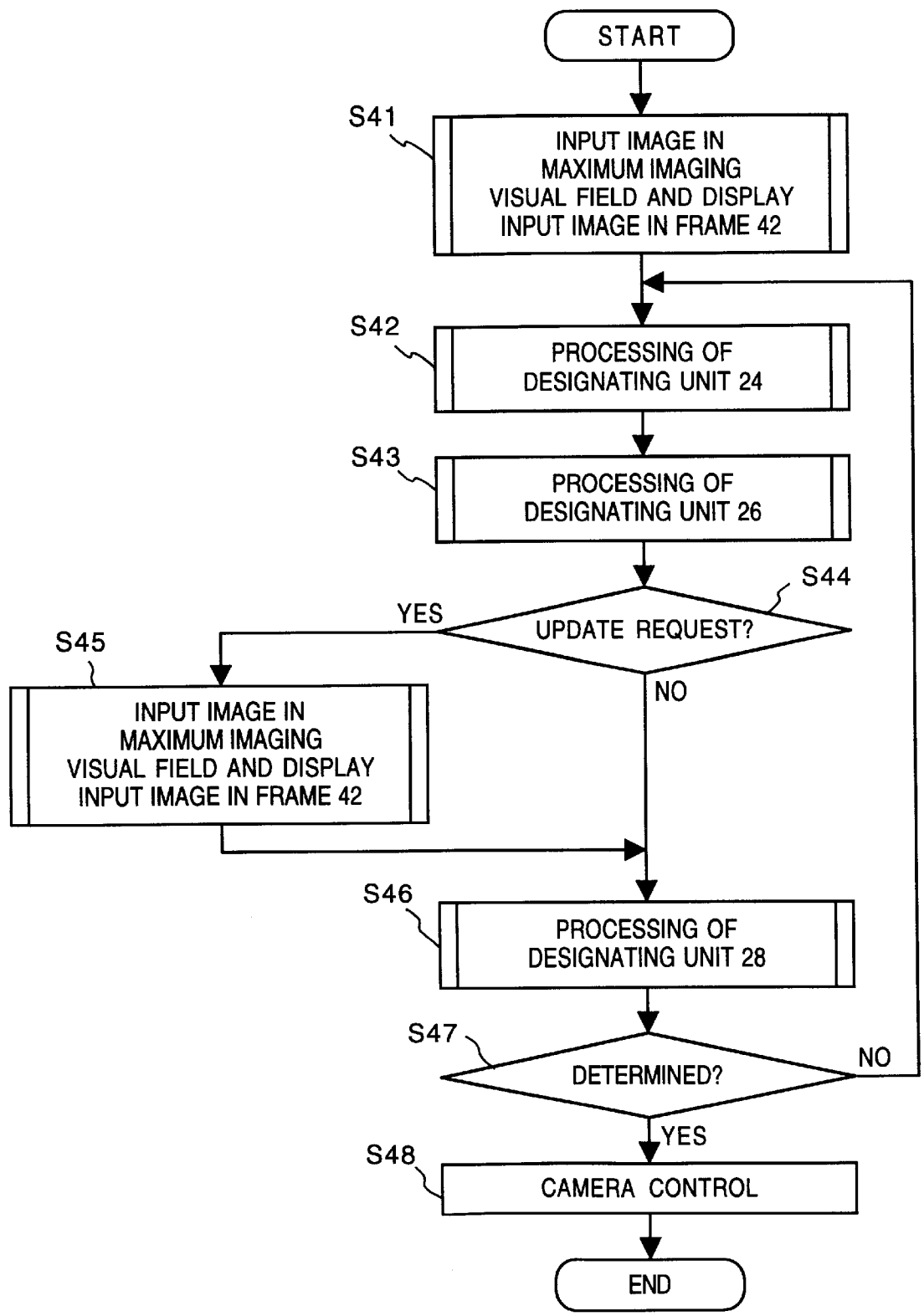
FIG. 7 is a flow chart of a modification of the main routine in the second embodiment.

FIG. 7 shows a modification of the main routine shown in FIG. 3. Referring to FIG. 7, in a rectangular frame 42 indicative of a potential maximum picking up visual field, an image corresponding to the maximum picking up visual field is displayed. That is, after the zoom ratio is set to the wide-angle end, images in the maximum picking up visual field are sequentially input while the camera is panned and tilted from one limit to the other. The input images are stored in a memory (e.g., a storage unit 34) and so displayed as to be fitted in the rectangular frame 42 (S41). Accordingly, the user can instantaneously see what object or person positions in which portion of the rectangular frame 42.

Thereafter, as in FIG. 3, processing (S42) of a designating unit 24 and processing (S43) of a designating unit 26 are called. If a designating unit 29 requests update of an image in the maximum visual field (S44), an image displayed in the rectangular frame 42 is updated (S45). That is, the zoom ratio is controlled to the wide-angle end, and images in the maximum visual field are sequentially input while the camera is panned and tilted from one limit to the other. These images are stored in a memory (e.g., the storage unit 34) and so displayed as to be fitted in the rectangular frame 42.

Subsequently, processing (S46) of a designating unit 28 is called. If an input of a camera operation is determined (S47), the panning, tilting, and zooming operations of the camera 10 are controlled to control values corresponding to the new position of a rectangular frame 44 (S48).

The image in the maximum picking up visual field displayed in the rectangular frame 42 is formed by connecting a plurality of input images, so distortion is conspicuous in the connected portions. However, this distortion does not impair the operational advantage of this embodiment. Also, the update request (S44) is not restricted to the operation of the designating unit 29 dedicated to the purpose. For example, it is evident that a plurality of particular operations can be used as update requests.

THIRD EMBODIMENT

Figure 8:
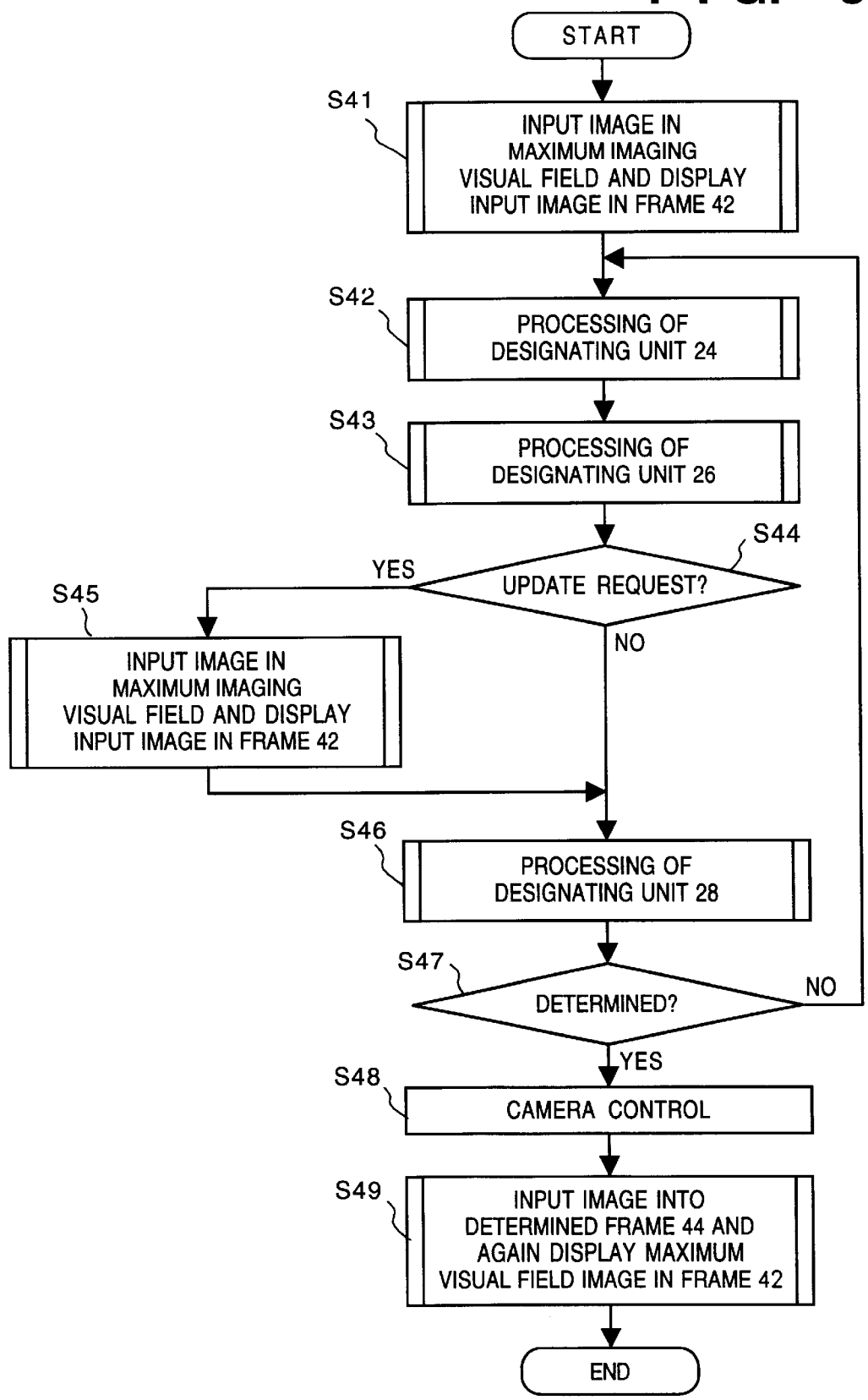
FIG. 8 is a flow change of a modification of the main routine in the third embodiment.

An image currently being taken can also be displayed to be fitted in a rectangular frame 44. FIG. 8 is a flow chart of this modification of the flow chart in FIG. 7. That is, after camera control (S48) an image taken by a camera 10 is input. By using this image, i.e., an image currently being taken, a portion corresponding to the rectangular frame 44 of an image in the maximum visual field range, which is input in step S41 or S45 and stored in a storage unit 34, is updated. Thereafter, the image in the maximum visual field range is updated in a rectangular frame 42 (S49).

With this operation, the user can check which image portion in the maximum visual field range is actually being taken and thereby can easily determine to which extent the panning, tilting, or zooming operation is to be adjusted.

As can be readily understood from the above description, according to the first to third embodiments of the present invention the user can clearly see the state of panning, tilting, or zooming within a controllable range and also can immediately control the camera to given control values regardless of the current state.

Furthermore, an image in the range of the maximum picking up visual field is input and displayed in the frame indicative of this maximum photographing visual field range. This allows the user to clearly see what object is within the picking up enable range and to readily understand how to operate the camera. This greatly improves the operability of the camera.

FOURTH EMBODIMENT

The fourth embodiment of the present invention will be described in detail below with reference to the accompanying drawings.

Figure 10:
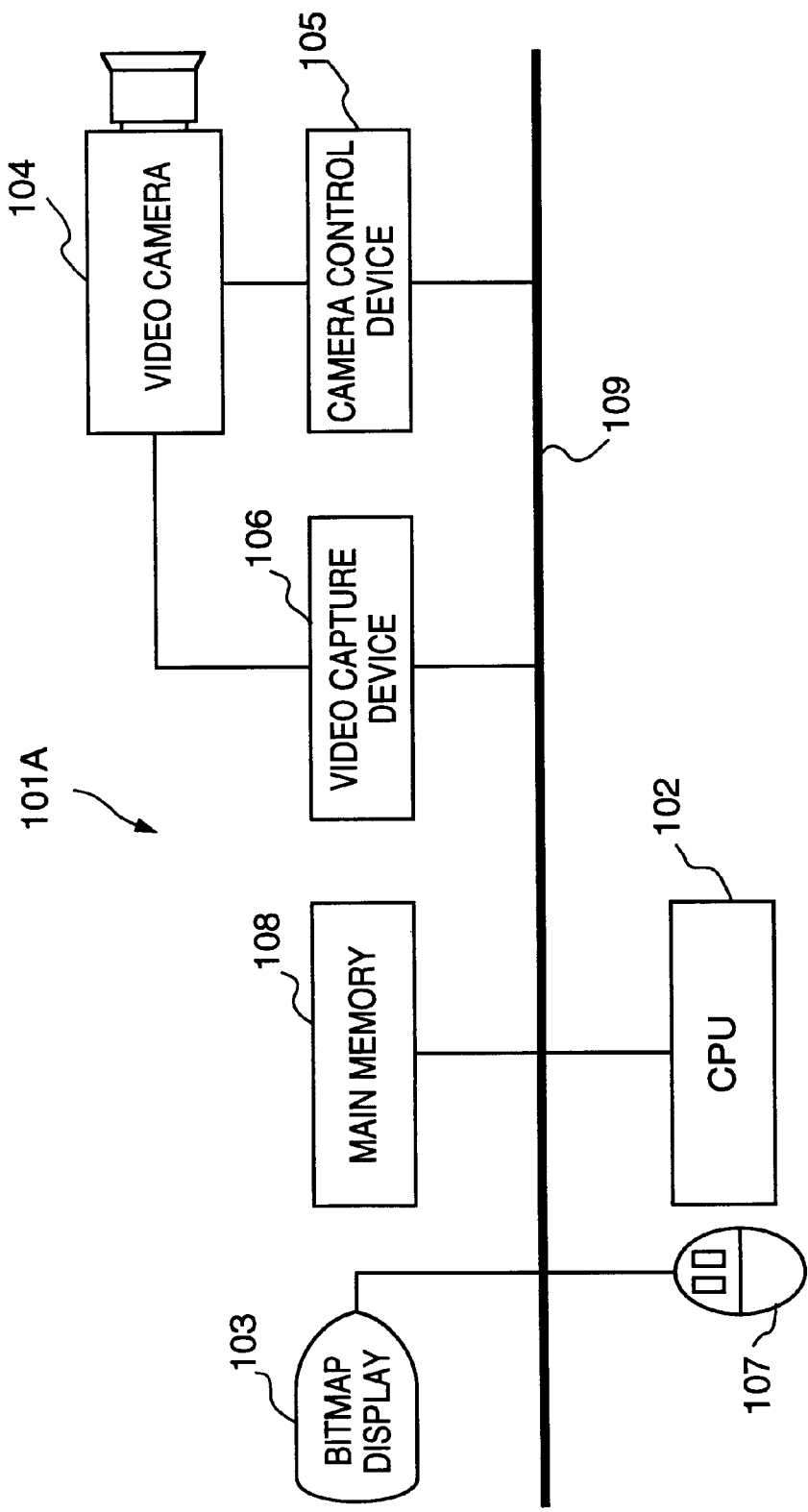
FIG. 10 is a block diagram of the fourth embodiment.

FIG. 10 is a block diagram showing a full-motion image display apparatus according to the fourth embodiment of the present invention.

A full-motion image display apparatus 101A of this fourth embodiment includes a CPU 102 as a control means for controlling the entire apparatus 101A. This CPU 102 is connected to a bit map display 103, a video camera 104, a camera control device 105, a video capture device 106, a mouse 107, and a main memory 108 through an internal bus 109. The bitmap display 103 is a display means capable of performing multi-window display and displaying full-motion images in the form of a window. The video camera 104 is a full-motion image input means for inputting full-motion image signal. The camera control device 105 is a picking up direction changing means for controlling the pivoting motions of the video camera 104 in the vertical and horizontal directions (panning and tilting). The video capture device 106 has a function of A/D-converting an input video signal from the video camera 104. The mouse 107 is a full-motion image area moving means used to move a full-motion image window 131 (see FIG. 11) as a full-motion image area. The main memory 108 stores, e.g., image information.

Figure 11:
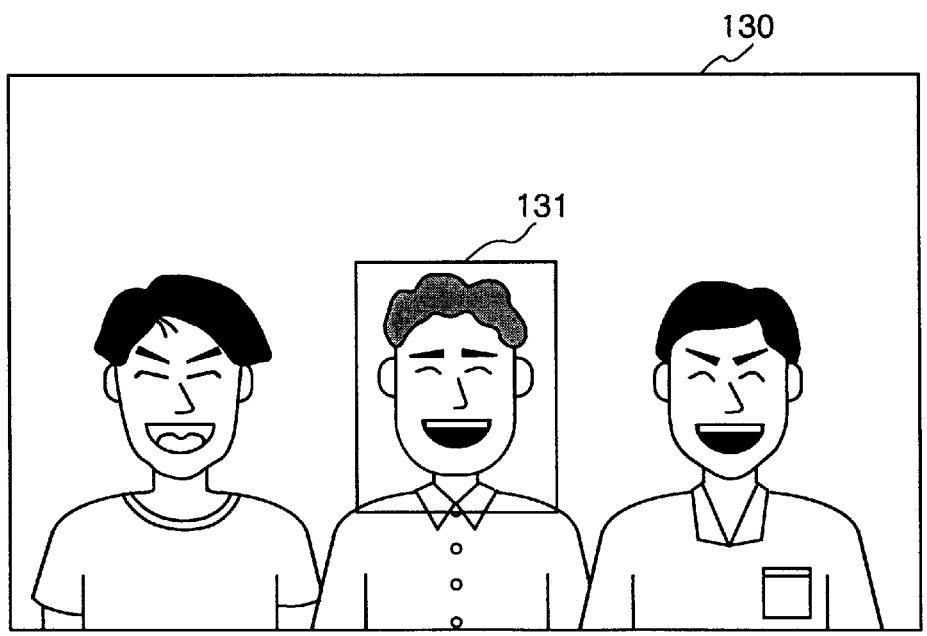
FIG. 11 is a view showing an example of the contents displayed on a bit map display in the fourth embodiment.

FIG. 11 shows an example of the contents displayed on the screen of the bitmap display 103 of this embodiment. Assume that a plurality of overlapped windows can be displayed on the bitmap display 103 and a window system is operating in the apparatus 101A. The display screen in FIG. 11 displays a still image window 130 as a still image area for displaying still images and the motion image window 131 located inside the still image window 130 to display full-motion images. Full-motion images taken from the video camera 104 by using the video capture device 106 are displayed in the full-motion image window 131. The position of this full-motion image window 131 can be moved in the still image window 130 by the use of the mouse 107. Assume that the still image window 130 is larger than the full-motion image window 131, and that the full-motion image window 131 is superposed on the still image window 130 at any instant.

The CPU 102 fetches images by controlling the video camera 104 in the vertical and horizontal directions, reconstructs an entire image in an area capable of being input by the video camera 104 as a still image, and displays this overall image (synthetic still image) as a still image in the still image window 130. Also, the CPU 102 displays an input motion image from the video camera 104 in the full-motion-image window 131. In this case the CPU 102 matches the directions of the video camera 104, the positions of the two windows 130 and 131, and the sizes of the images being displayed, in order that the full-motion image displayed in the full-motion image window 131 corresponds to a certain area of the overall image displayed in the still image window 130. That is, the still and full-motion images are displayed as if a portion of the still image is replaced with the full-motion image. It is not particularly necessary to control the direction of the camera 104 if the background to be displayed perfectly remains still or a moving object or person exists only in a certain fixed place. If the circumstances of the background change or the position of the moving object changes and hence the direction of the camera 104 needs to be changed, the user moves the full-motion image window 131, displayed at the same position with the same size as the corresponding area in the still image window 130, by using the mouse 107, thereby moving the position of the full-motion image window 131 to the object of interest. In accordance with this operation, the CPU 102 controls the direction of the video camera 104 so that the full-motion image constantly points in an appropriate direction with respect to the overall image. Additionally, the CPU 102 updates a portion of the synthetic still image, in which the still image window 130 exists before the movement, by using the full-motion image displayed in the full-motion-image window 131.

Figure 12:
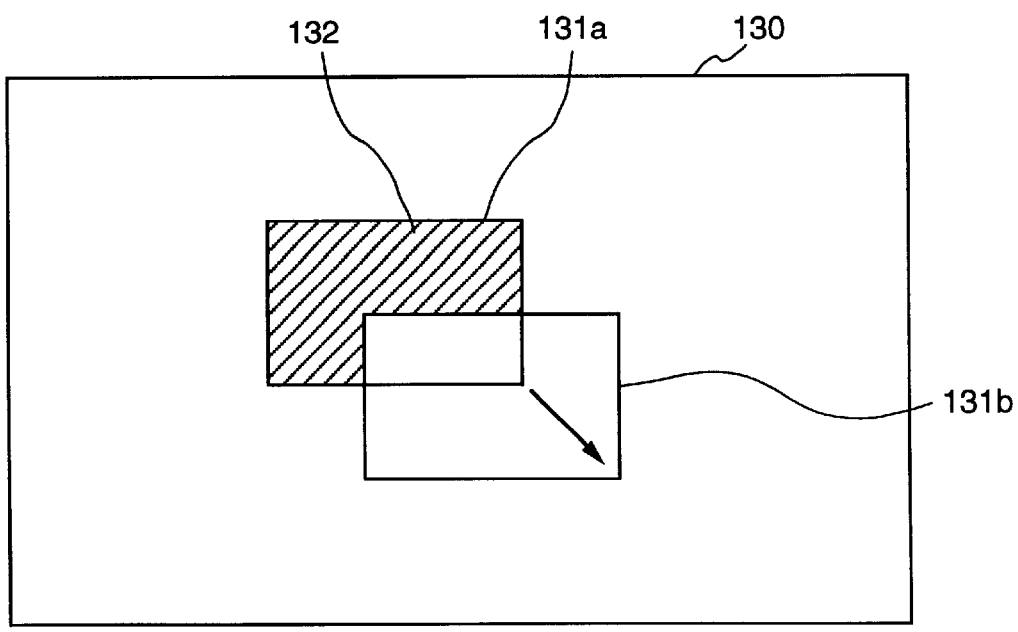
FIG. 12 is a view for explaining a movement of a motion image window.
Figure 13:
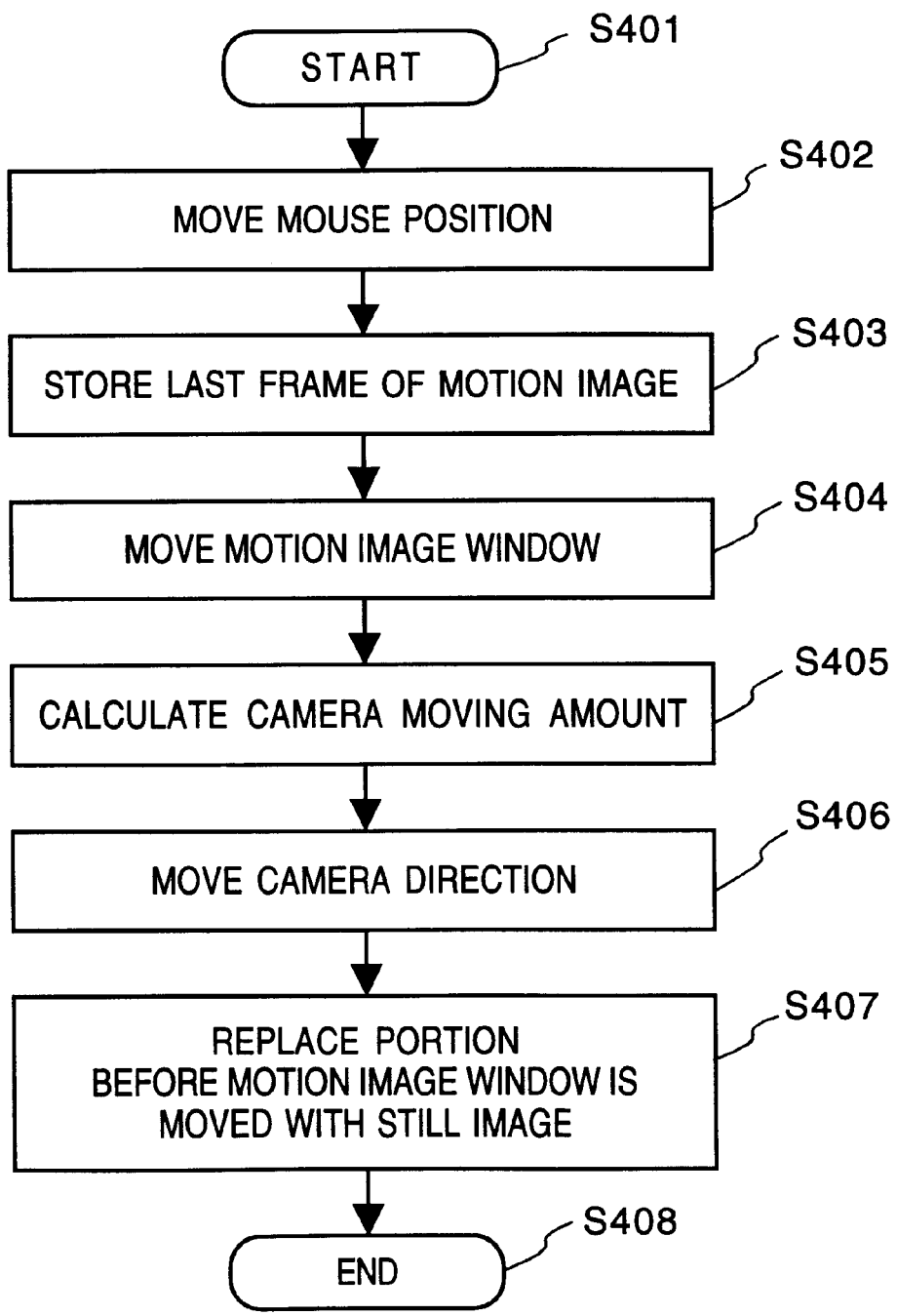
FIG. 13 is a flow chart showing an operation of moving the motion image window in the fourth embodiment.

With reference to FIG. 12, the operation of this embodiment will be described in accordance with the flow chart in FIG. 13. FIG. 12 is a view showing the way the full-motion image window 131 is moved. In FIG. 12, reference numeral 131a denotes a full-motion-image window before the movement; and 131b, a full-motion image window after the movement. FIG. 13 is a flow chart showing the procedure of moving the full-motion image window 131.

Figure 14:
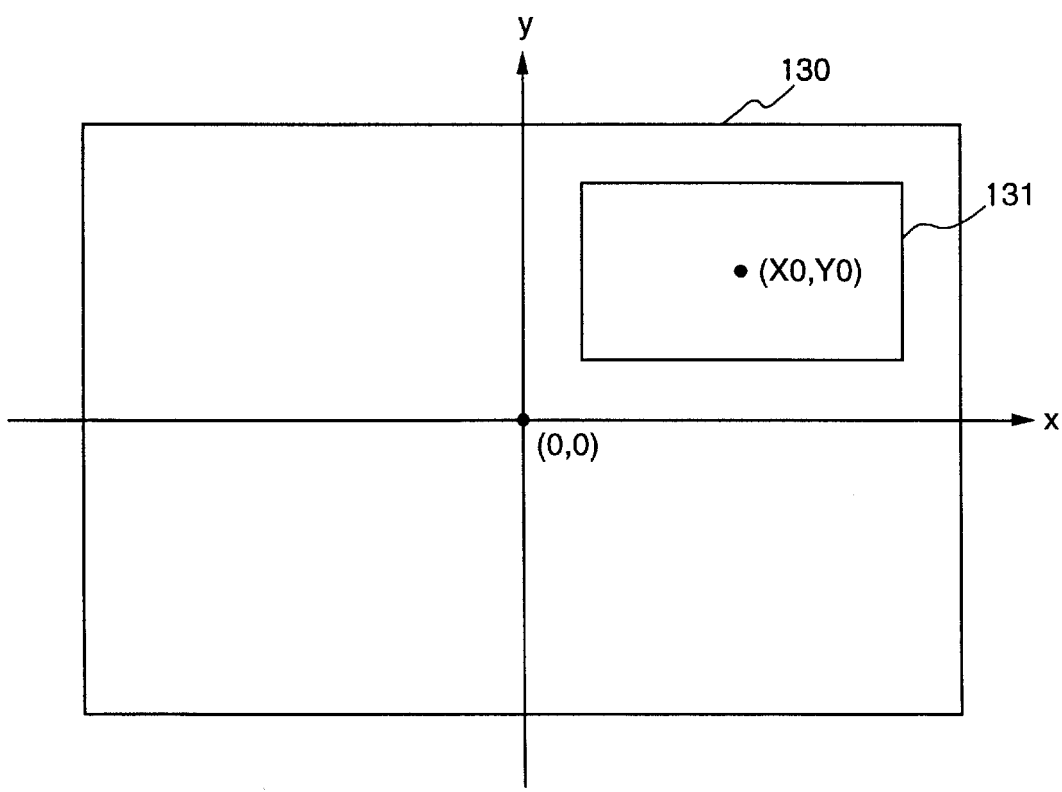
FIG. 14 is a view for explaining a coordinate system on the display screen of the bit map display in the fourth embodiment.

When the user moves the full-motion image window 131 from the position 131a to the position 131b by using the mouse 107, the CPU 102 detects the moving amount of the mouse 107 (S402). The main memory 108 holds an image 132 of the last frame of the full-motion image displayed in the full-motion image window 131a (S403) and moves the position of the full-motion image window 131 in accordance with the moving amount of the mouse 107 (S404). Note that this operation of moving the window 131 is realized by using a window management function of the window system. The CPU 102 detects the moving amount of the mouse 107 and calculates the moving amount and the position of the camera 104 (S405). Assuming a coordinate system is defined as illustrated in FIG. 14, the direction $(\theta, \phi)$ of the camera 104 and the position (X0, Y0) of the full-motion image window 131 meet the following equations:

$$X0 = R \cdot \tan \theta$$
$$Y0 = R \cdot \tan \phi \qquad (1)$$

where the direction $(\theta, \phi)$ of the camera includes $\theta$: a panning angle in the horizontal direction and $\phi$: a tilting angle in the vertical direction, and R is a constant. The CPU 102 calculates the direction of the camera 104 from the position of the full-motion image window 131 in accordance with Equation (1) and issues an instruction of movement to the camera control device 105, thereby moving the direction of the camera 104 (S406). Additionally, since the full-motion image window 131 is thus moved, in the still image displayed in the still image window 130 the CPU 102 replaces the image (to be updated) 132 in the full-motion image window 131a before being moved with the image of the last frame of the full-motion image stored in step S403. By this operation, when the full-motion image window 131 is moved the still image in the location in which the full-motion image window 131 originally exists is updated by the image of the last frame of the full-motion image.

Assume that the camera 104 has a zoom function and therefore can perform a zoom up and down. If the zoom ratio of the camera is changed, the size of the full-motion image becomes different from the size of the surrounding still image. If this is the case, in this embodiment the zoom ratio is read out from the camera control device 105. A synthetic still image need only be zoomed up or down in accordance with the readout zoom ratio. That is, if the rate of change in the magnification before and after the zooming is Z, the rate of change in the display magnification of a still image also is set to Z. Note that in the case of a zoom up or down of a still image, the display magnification is changed so that zooming is done about the center ((X0, Y0) in FIG. 14) of the full-motion image window 131. Note also that this display control of a synthetic still image when the zoom ratio of the camera is changed is applicable to the first to third embodiments described previously.

Figure 15:
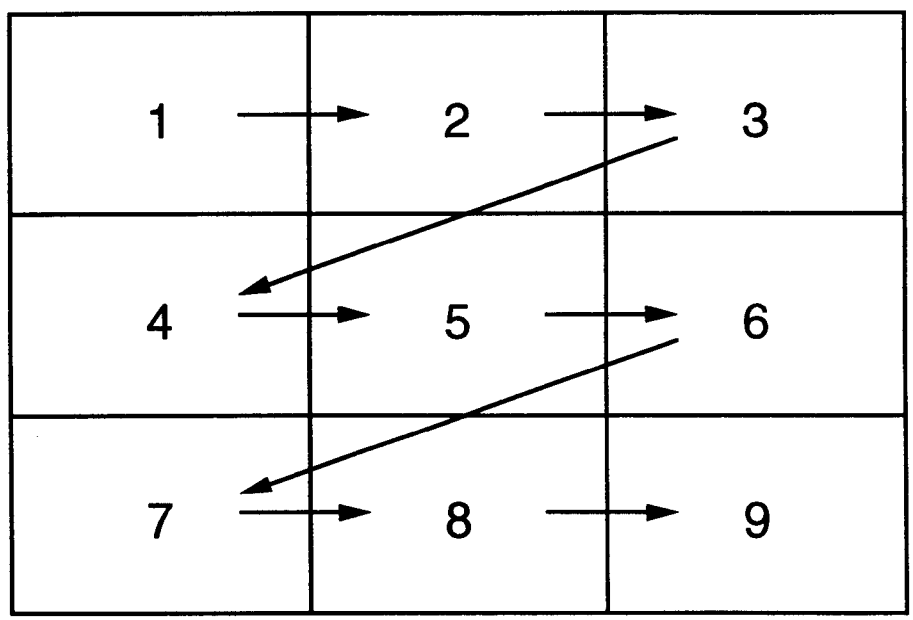
FIG. 15 is a view for explaining a method of synthesizing still images.

As the initial display contents upon start-up, an overall image is constructed and displayed by previously scanning an entire area by using the camera 104, as in the second and third embodiments. As an example, if the still image window 130 is nine times as large as the full-motion image window 131 as illustrated in FIG. 15, nine images are synthesized by scanning the full-motion image window 131 in the order of 1→2→3→ . . . →9. Also, in this embodiment full-motion images can be displayed in the full-motion image window 131 either by software processing by the CPU 102 or by using special hardware for displaying full-motion images, provided that the software or hardware has a function by which an overall image in a portion underneath the full-motion image window can be updated by the newest frame of a full-motion image when the position of the full-motion image window is moved. For example, the software or hardware need only include a function of storing a specific frame of a full-motion image as a still image and a function of replacing a designated portion of an overall image with the stored still image.

In the fourth embodiment as described above, even if full-motion image display processing is slow on a large screen or it is difficult to display full-motion images over a wide area with a high definition at a desired frame rate since performance, such as the full-motion image bus transfer rate, for inputting and displaying full-motion images is not so high, an image over a wide area which communicates an entire atmosphere is displayed as a still image, a portion of interest is displayed as a full-motion image with a size and a resolution meeting the performance, and these two images are synthesized and displayed while their positions and sizes are matched. The result is that the images are displayed as if a portion of the still image is replaced with the full-motion image, so the full-motion image within a narrow area and the still image over a wide area can be simultaneously seen. This permits an efficient full-motion image display with little computer resources. Also, even if objects of interest cannot be simultaneously fitted in the picking up area of the camera 104, an entire atmosphere can be communicated by displaying a still image synthesized by scanning the full-motion image window 131, and the portions of interest can be displayed as a full-motion image. Additionally, since a portion of the entire image is displayed as if the portion is replaced with a full-motion-image, the relationship between the details and the whole is readily recognizable. If an object in a portion which cannot be fitted in the full-motion image window 131 does not move so often, a still image can be updated occasionally. If an object of interest moves, the user can move the full-motion image window 131 by using the pointing device such as a mouse to thereby aim the camera 104 in the direction of movement. Also, the relationship in which a full-motion image is displayed as if it is a part of a still image is held by the movement. Accordingly, the user can readily understand the correspondence between a whole image and a portion of interest. Furthermore, not an entire area of a whole image but a portion in which the full-motion image window 131 passes or a portion of interest alone is updated. This results in a small updated amount of the whole image and hence a small processing load.

FIFTH EMBODIMENT

Figure 16:
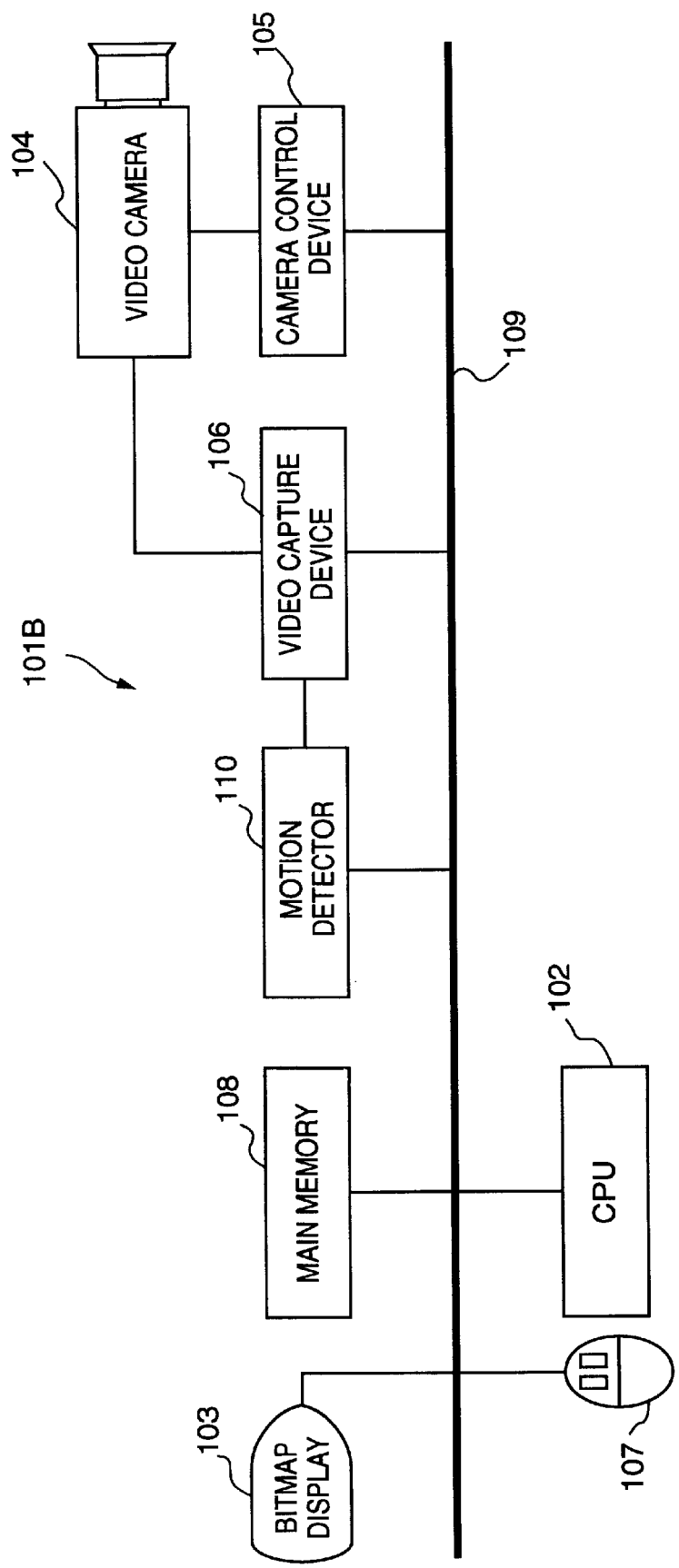
FIG. 16 is a block diagram of the fifth embodiment.

FIG. 16 is a block diagram showing a full-motion image display apparatus according to the fifth embodiment of the present invention.

A full-motion image display apparatus 101B of this fifth embodiment is obtained by adding a motion detector 110 to the full-motion image display apparatus 101A of the fourth embodiment. Accordingly, the same reference numerals as in the fourth embodiment denote the same parts, and a detailed description thereof will be omitted.

If a still image is updated only in a location to which a full-motion image window 131 is moved using a mouse 107, a portion of the still image may not be updated at all although there is a change in that portion. To avoid this inconvenience, a whole still image is updated by scanning a camera 104 across an area corresponding to the whole still image. This update of the entire image can be accomplished such that, if a still image window 130 is nine times as large as the full-motion image window 131 as shown in FIG. 15, nine images are synthesized by scanning the full-motion image window 131 in the order of 1→2→3→ . . . →9.

The scan is executed at a timing determined by a interrupt from the motion detector 110. That is, if no motion is detected over a predetermined time, the motion detector 110 generates an interrupt signal. A CPU 102 receives this signal and executes the operation of updating the whole still image, FIG. 15. When this operation of updating the whole still image is completed, the CPU 102 switches to update of a still image done by moving the full-motion image window 131 using the mouse 107. Initial display contents upon start-up can be formed by first performing the above update scanning.

In addition to the effect of the fourth embodiment, the fifth embodiment with the above arrangement has the effect of periodically updating an overall image when there is no motion. This eliminates the possibility that a portion of a still image is not at all updated although there is a change in that portion.

SIXTH EMBODIMENT

As a modification (sixth embodiment) of the fifth embodiment, it is also possible to forcedly. update a still image at a fixed period even if there is a motion. This is accomplished by generating a timer interrupt to a CPU 102 at each fixed period and performing the still image update scanning, FIG. 15, each time this timer interrupt is generated. In the fifth embodiment described above, a portion which is not at all updated may be produced in a still image if there is a constant motion. In this sixth embodiment, however, a portion which is not at all updated is not produced because a still image is forcedly updated at a fixed period.

SEVENTH EMBODIMENT

In addition to the operation of the sixth embodiment, a camera 104 can also be scanned as follows. That is, while an object in a full-motion image is moving the camera 104 tracks the moving object, and the position of the full-motion-image with respect to a still image is changed in accordance with the tracking. While an object in the full-motion image remains still, the still image is updated periodically. Assume that during the scan a motion detector 110 detects a motion of the full-motion-image obtained by the camera 104. Assume also that the motion detector 110 can detect a motion of a local area in an entire image (entire area) and obtain the direction and the amount of the motion from the difference between individual frames or by using an image processing method such as an optical flow, by taking account of the fact that the whole image moves due to the scan of the camera 104 while an object is being tracked. By using the direction and the amount of the motion thus obtained in place of an input from a mouse 107, it is possible to track the moving object with the camera 104. When this function is added to the sixth embodiment described above, while an object in a full-motion image is moving the camera 104 can track the moving object, and at the same time the position of the full-motion image with respect to a still image can be changed according to the tracking. Also, while an object in the full-motion image remains still, a still image can be updated periodically. Since a still image is updated by automatically tracking a moving portion, the user need not perform a moving operation using, e.g., the mouse 107 and hence is released from a cumbersome operation of the mouse or the like device.

Figure 17:
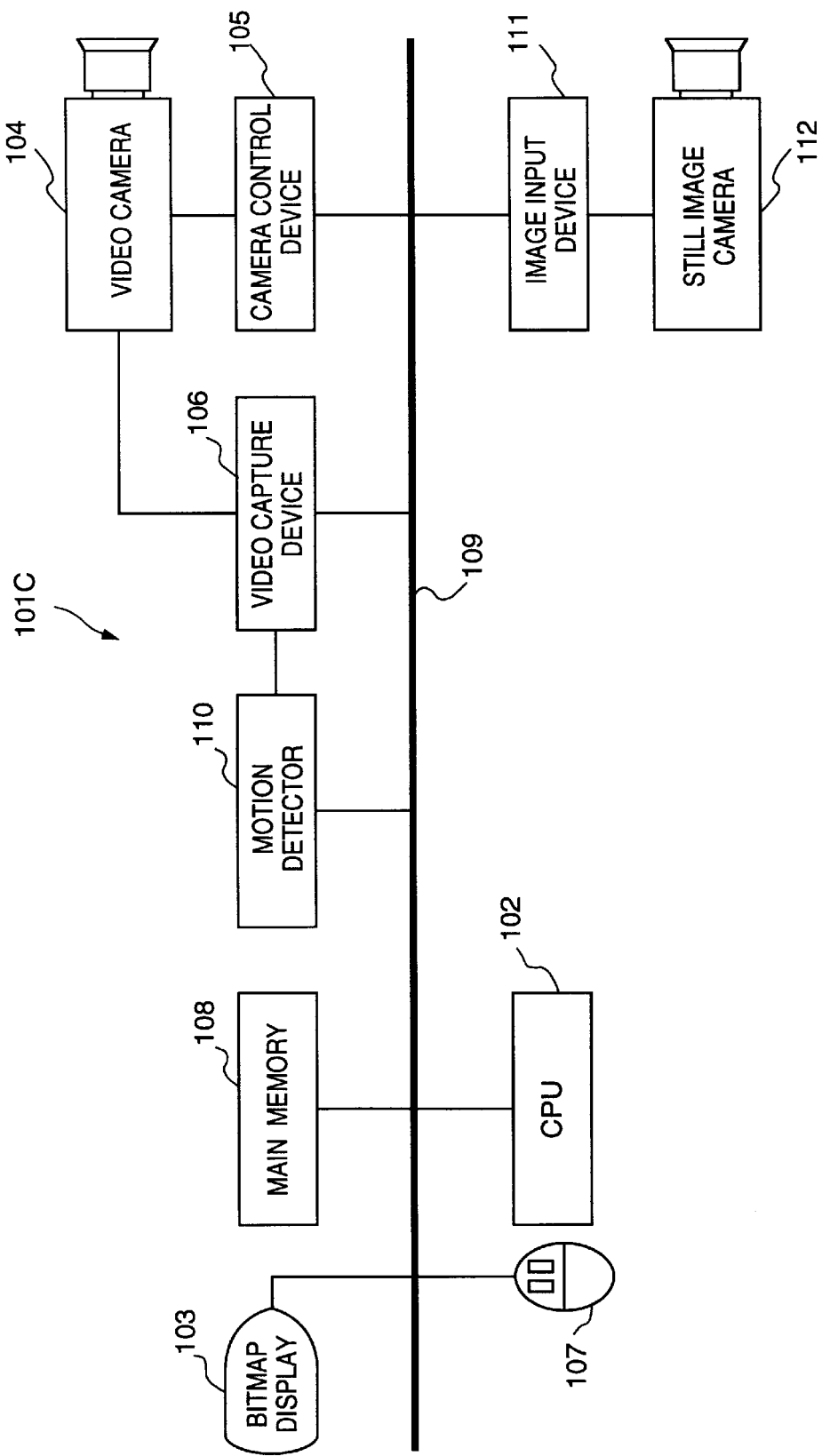
FIG. 17 is a block diagram of the seventh embodiment.

FIG. 17 is a block diagram showing a full-motion image display apparatus according to the seventh embodiment of the present invention.

A full-motion image display apparatus 101C of this seventh embodiment is obtained by connecting an image input device 111 and a still image camera 112 to the full-motion image display apparatus 101B of the fifth and sixth embodiments.

In the fifth and sixth embodiments a still image is updated by scanning the camera 104. However, this seventh embodiment makes use of a still image taken by the still image camera 112 with a wider angle than that of a video camera 104.

The image input device 111 writes the image taken by the still image camera 112 into a main memory 108.

An entire image is updated by periodically inputting an image from the still image camera 112. The image obtained by the still image camera 112 has a higher definition than that of an image obtained by a full-motion image camera. For example, the still image camera 112 can simultaneously photograph images corresponding to the areas 1 to 9 in FIG. 15. These areas of the still image can be updated either simultaneously or separately nine times in the order of the areas 1 to 9 in the same way as when a full-motion image camera is used.

In the seventh embodiment which additionally includes the wide-angle still image camera 112 as described above, it is no longer necessary to occasionally scan the video camera 104 to synthesize an entire image (still image). Accordingly, the video camera 104 can be exclusively used to take full-motion images. It is also possible to update a still image and input and display a full-motion image independently of each other.

EIGHT EMBODIMENT

Figure 18:
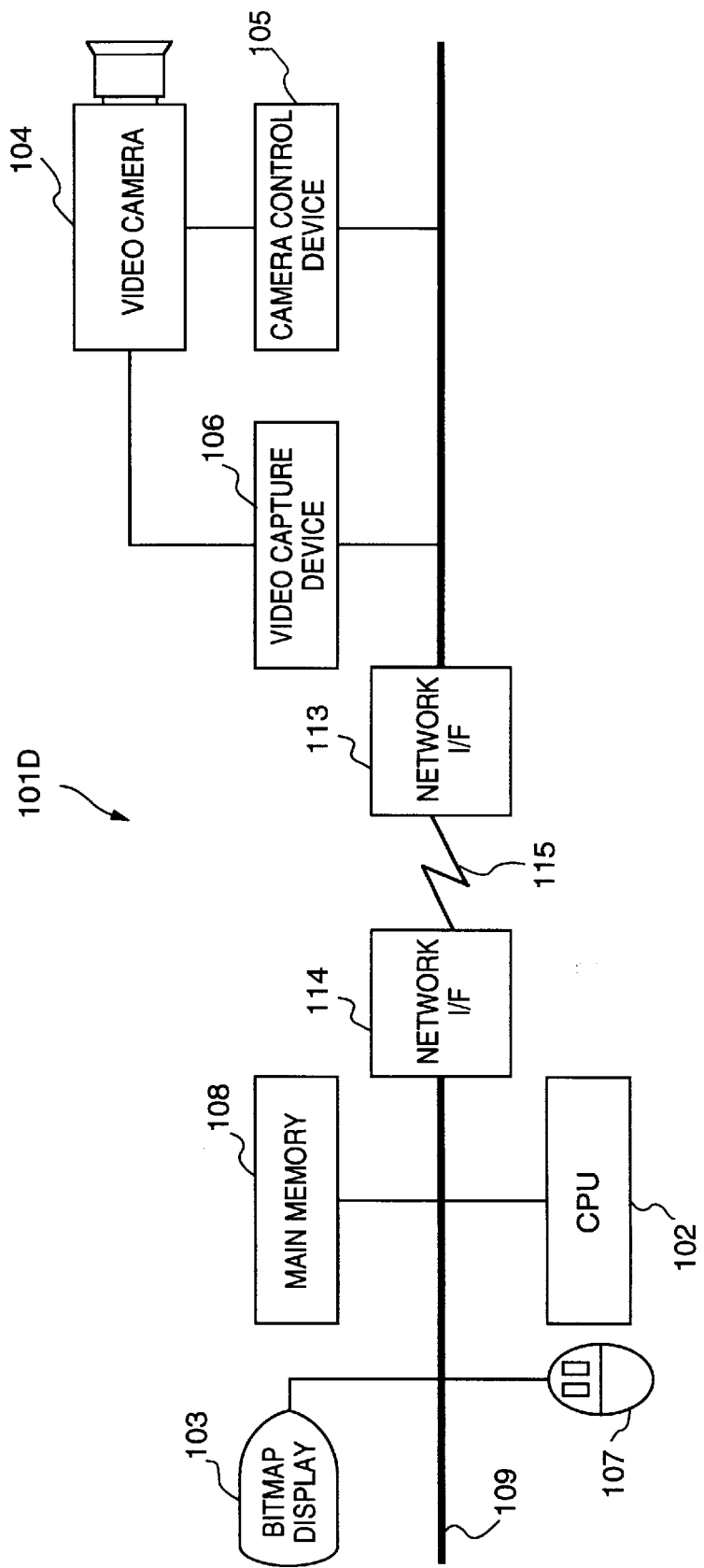
FIG. 18 is a block diagram of the eighth embodiment.

FIG. 18 is a block diagram showing a full-motion image display apparatus according to the eight embodiment of the present invention.

In the full-motion-image display apparatus 101A of the fourth embodiment described earlier, the video camera 104 and the camera control device 105 are connected to the common bus 109 which is also connected to the bit map display 103. In a full-motion image display apparatus 101D of this eighth embodiment, as illustrated in FIG. 18, these devices are connected through communication network interfaces (I/Fs) 113 and 114 and a communication network 115. That is, a camera direction moving instruction is issued from a CPU 102 via the network 115 and transmitted to a camera control device 105.

Also, an input image from a video camera 104 is received by a video capture device 106 and transferred through an internal bus 109 via the network 115. The last frame of the image is stored by using the CPU 102 and a main storage 108 and displayed in a full-motion image window 131 of a bitmap display 103. The rest of the operation is the same as in the fourth embodiment. In this embodiment, only the contents to be displayed in the full-motion image window 131 are transferred via the network 115.

In the eighth embodiment with the above arrangement, only a portion of interest in an overall image is updated. Accordingly, even if a whole image is large the transfer amount in the network 115 can be greatly reduced, when compared to the case in which a whole image is transferred as a full-motion image at any instant. Also, in this embodiment an existing computer networks can be utilized unlike in the first embodiment described previously in which remote control is performed using dedicated cables. This allows an easy movement of the cameras.

In the above embodiment, a line-of-sight or visual axis input device can be used instead of the mouse 107. This line-of-sight input device senses the direction of line of sight of a user and determines which part in the bitmap display 103 the user is seeing. The line-of-sight input device with this function therefore can be used in place of the pointing device. This modification is identical with the above embodiment except that the mouse 107 is replaced with the line-of-sight input device. The visual properties of the human eye are such that the visual acuity is high only near the center (called a central pit) in the direction of line of sight and significantly decreases in a portion away from the central pit. By using this principle, the position of the full-motion image window 131 is moved in accordance with the direction of line of sight of a user. The position of the full-motion image window 131 and the direction of the camera 104 are changed so that the center of the full-motion image window constantly comes in the direction of line of sight. Consequently, a full-motion-image is presented only in a portion in which the best visual acuity is attained, and a still image (precisely a full-motion image which is updated a lesser number of times) is displayed in the remaining portion which is away from the central pit and in which the visual acuity is low. Accordingly, full-motion images meeting the visual properties of the human eye can be displayed while the load on a computer is kept small.

NINTH EMBODIMENT

Figure 19:
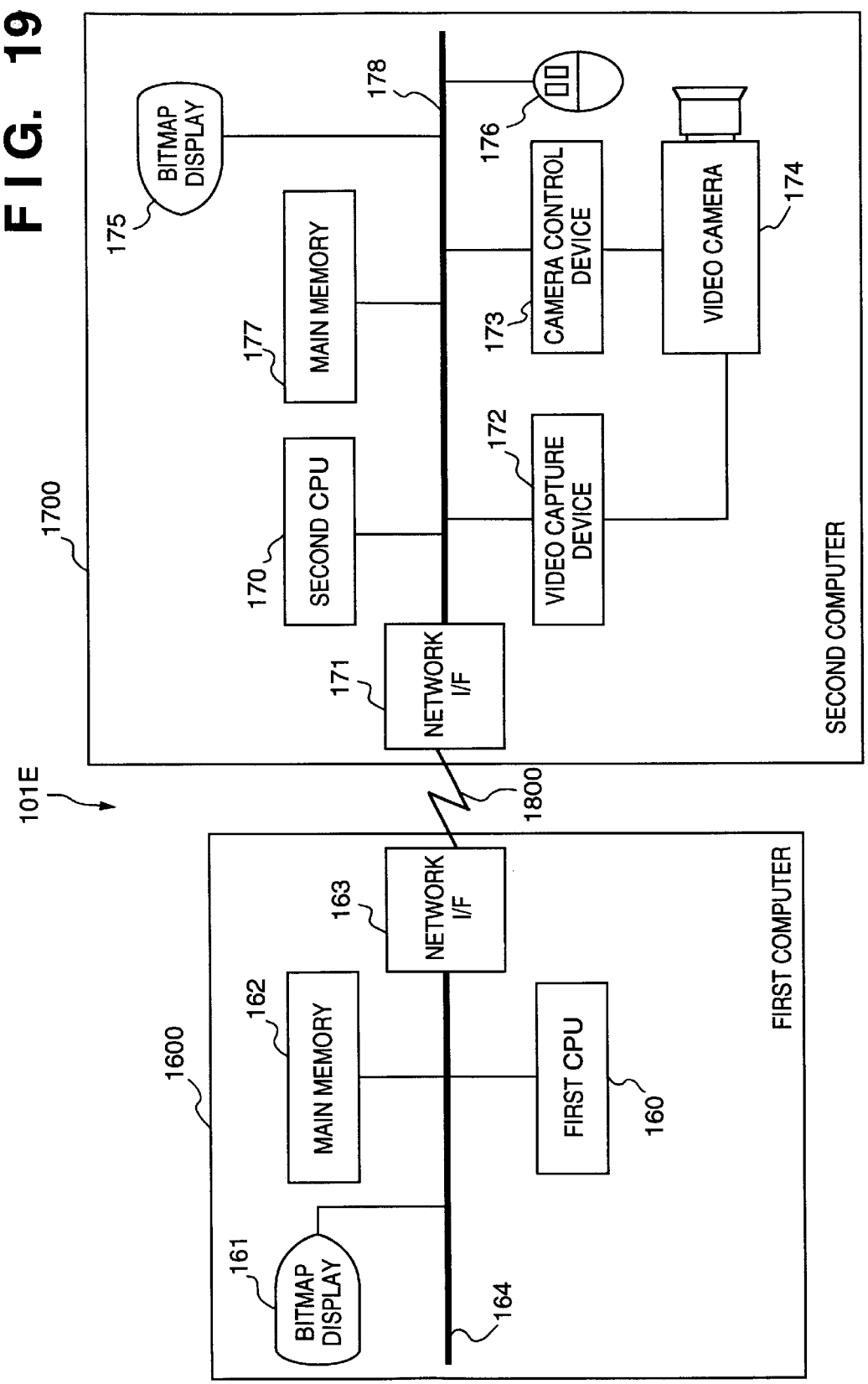
FIG. 19 is a block diagram of the ninth embodiment.

FIG. 19 is a block diagram showing a full-motion image display apparatus according to the ninth embodiment of the present invention.

In a full-motion-image display apparatus of this ninth embodiment, a first computer 1600 and a second computer 1700 are connected via a communication network 1800. The position of a full-motion image window 131 is controlled on the side where a full-motion image picking up means is installed, and displayed, in the same fashion as in the fourth embodiment, on a display means in a location away from the installation site of the full-motion image picking up means. That is, the operation of moving the full-motion image window 131 is not performed on the display side, and the picking up direction is controlled on the side where the full-motion image picking up means is located.

The first computer 1600 has a first CPU 160 for controlling the entire first computer 1600. This first CPU 160 is connected to a bit map display 161, a main storage 162, and a network interface (I/F) 163 through an internal bus 164 and used to display input images from a camera 174 (to be described later) of the second computer 1700 in a remote place.

The second computer 1700 has a second CPU 170 for controlling the entire second computer 1700. This second CPU 170 is connected to a network interface (I/F) 171, a video capture device 172, a camera control device 173, a video camera 174, a bitmap display 175, a mouse 176, and a main storage 177 through an internal bus 178. That is, the network interface (I/F) 178 is added to the configuration of the fourth embodiment.

Assume that an input full-motion image from the video camera 174 and a still image (the whole image described in the fourth embodiment) generated from the input full-motion image are displayed in the still image window 130 and the full-motion image window 131 of each of the bitmap display 161 of the first computer 1600 and the bitmap display 175 of the second computer 1700 in synchronism with each other. Assume also that the positions and the sizes of the still image window 130 and the full-motion image window 131 are set as if a portion of the still image (whole image) is replaced with the full-motion image, as in the fourth embodiment. The whole image also is generated in the same manner as in the fourth embodiment.

The difference from the fourth embodiment is that the full-motion image window 131 is not moved by operating a mouse 102 on the computer side (where no camera is connected). That is, the still image window 130 and the full-motion image window 131 displayed on the bit map display 175 of the second computer 1700 are also displayed on the bit map display 161 of the first computer 1600 via the network 1800, while the relative positional and dimensional relationships between the two windows are held fixed. When the direction of the camera 174 is controlled using the mouse 176 in the second computer 1700, the resulting whole image and full-motion image are also displayed on the bit map display 161 of the first computer 1600.

In the ninth embodiment with the above arrangement, a portion of interest can be predominantly transferred with a small communication transfer amount. Accordingly, it is possible to efficiently transfer and display full-motion images on a large screen. Additionally, in the second computer 1700 not only the direction of the camera 174 is controlled by using the mouse 176 but also the second CPU 170 performs processing of automatically detecting a moving object of interest. This makes it possible to track an object of interest which is automatically detected from an input image from the camera 174. Consequently, an object of interest can be predominantly transferred with a small communication transfer amount without causing the user to track the object of interest by using the mouse 176. This allows an efficient transfer and display of full-motion images on a large screen.

TENTH EMBODIMENT

FIG. 20 is a block diagram showing a full-motion-image display apparatus according to the tenth embodiment of the present invention.

In a full-motion image display apparatus 101F of this tenth embodiment, a first workstation 1900 and a second workstation 2000 are connected via a communication network 2100. By use of the combination of the eighth and ninth embodiments, the picking up direction can be controlled from both of a place where a full-motion image picking up means is located and a remote place away from the full-motion image picking up means via the network 2100.

The first workstation 1700 includes a mouse 192 for operating a full-motion image window 191 displayed in a still image window 190.

The second workstation 2000 is connected to a mouse 202 for operating a full-motion image window 201 displayed in a still image window 200 and a video camera 203. The second workstation 2000 is also connected to a video capture board and a camera control device (neither is shown) analogous to those used in the fourth embodiment. That is, the second workstation 2000 has the same arrangement as the first computer 1600 except that the mouse 202 is additionally connected to the internal bus 164. Assume an input full-motion image from the video camera 203 is displayed in the full-motion image window 201.

Since this embodiment has two control systems, control contention may occur. To prevent this, a control mediation function by which a system which acquires the control of the camera 203 performs control is used. The control of the camera 203 is as follows. That is, while one control system is moving the camera, any operation from the other is rejected. "Operation reject" is to display a message indicating that the other system is in operation and reject any operation done by the mouse 202 while the other is in operation.

In the tenth embodiment with the above arrangement, the use of the control mediation function makes it possible to control the direction of the camera 203, without any control contention, from both of the place where the camera 203 is installed and the remote place away from the camera 203 via the network 2100. Accordingly, the position of the full-motion image window 201 in the still image can be moved from both the place where the camera 203 is located and the remote place away from the camera 203 via the network 2100.

The fourth to tenth embodiments described above achieve the following effects.

That is, it is possible to provide a full-motion image display apparatus which, even if full-motion image display processing on a large screen is slow or a full-motion image in a wide area is difficult to display with a high definition because the full-motion image transfer rate is not so high, can display an image over a wide area which communicates an overall atmosphere as a still image and a portion of interest as a full-motion image. Additionally, since the static and full-motion images are displayed by synthesizing them while their positions and sizes are matched as if a portion of the still image is replaced with the full-motion image, full-motion images can be displayed efficiently with little computer resources. Also, not the whole synthetic still image but only the portion of interest is updated, so only a small data amount needs to be updated. Accordingly, it is possible to communicate the circumstances over a wide area in a remote place by transmitting the portion of interest as a full-motion-image and the rest as a still image. Furthermore, an efficient full-motion image display is possible.

The circumstances over a wide area in a remote place can be communicated, an efficient full-motion image display is possible, and a moving portion is automatically tracked. This releases the operator from a cumbersome operation of moving a full-motion image area.

Since a whole synthetic still image is periodically updated, a portion which is not at all updated although there is a change in that portion is not produced in a still image.

The operator is released from a cumbersome operation of moving a full-motion image area and can update a whole synthetic still image while the motion detecting means is not detecting a motion of an object.

The circumstances over a wide area in a remote place can be communicated, an efficient full-motion image display is possible, and the still image input means is provided independently of the full-motion image input means. Accordingly, still image synthesizing processing can be omitted.

The circumstances over a wide area in a remote place can be communicated, an efficient full-motion image display is possible, and a moving portion is automatically tracked. This releases the operator from a cumbersome operation of moving a full-motion-image area. Also, since the still image picking up means is provided independently of the full-motion image input means, still image synthesizing processing can be omitted.

Since only a portion of interest is updated, the transfer amount in a communication network can be greatly reduced.

An operation of moving a full-motion image area can be performed in a place where the full-motion image input means is located.

An operation of moving a full-motion image area can be performed both in a place where the full-motion image input means is located and a remote place away from the full-motion image input means.

The use of a line-of-sight input device releases the operator from a cumbersome operation of moving a full-motion image area.

OTHER EMBODIMENT

The present invention can be applied to a system constituted by a plurality of devices or to an apparatus comprising a single device.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS or the like working on the computer performs a part or entire processes in accordance with designations of the program codes and realizes functions according to the above embodiments.

Furthermore, the present invention also includes a case where, after the program codes read form the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A camera control device, comprising:

control means for controlling a camera, said camera having a limiter of at least one of panning and tilting; and display means connected to said control means for displaying a first area which maximum visual field is defined by said limiter of movement of at least one of panning and tilting of the camera and which exceeds a current imaging range of the camera, and a second area which indicates the current imaging range and direction of the camera controlled by said control means at a position inside the first area.

2. The device according to claim 1, further comprising:

operating means for operating the second area displayed by said display means.

3. The device according to claim 1, further comprising:

means for inputting an image which can be sensed as defined by the limits of at least one of panning and tilting of the camera at a predetermined timing, and displaying the input image in the first area.

4. The device according to claim 3, wherein the predetermined timing is when camera control is started.

5. The device according to claim 3, wherein the predetermined timing is when an operator inputs a specific instruction.

6. The device according to claim 3, wherein the predetermined timing is when a camera operation input is determined.

7. The device according to claim 1, wherein said camera comprises an externally controllable zoom function, and said display means displays the first area which is defined by the limits of panning and tilting and a wide-angle end of zooming, and the second area which indicates a current imaging range inside the first area and having a position and a size corresponding to current panning, tilting, and zooming conditions.

8. The device according to claim 1, further comprising:

operating means having a pointing device for operating a camera operation area set inside and/or in the vicinity of the second area displayed by said display means;

wherein said control means updates the display of the second area and controls said camera in accordance with the operation by said operating means.

9. The device according to claim 8, wherein said control means updates the display position of the second area and controls said camera in accordance with a predetermined operation by the pointing device started from inside the camera operation area by said operating means.

10. The device according to claim 9, wherein the predetermined operation by the pointing device is a drag operation by a mouse.

11. The device according to claim 8, wherein said control means updates the display size of the second area and controls said camera in accordance with a predetermined drag operation started from inside the camera operation area by said operating means.

12. A control device connected with control means for controlling a camera having a limiter for at least one of panning and tilting, comprising:

first area display means for displaying a first area which maximum visual field is defined by said limiter of movement of at least one of panning and tilting of said camera and which exceeds a current imaging range of the camera;

second area display means for displaying an imaging visual field which indicates the current imaging range and direction, as a second area, at a position inside the first area;

designating means for designating a movement of the displayed second area; and area display updating means for updating the displayed the second area in accordance with the contents designated by said designating means;

wherein said control means controls an imaging direction of said camera in accordance with the designated contents by said designating means.

13. The device according to claim 12, wherein said designating means is a pointing device.

14. The device according to claim 12, further comprising:
synthesizing means for repeatedly causing said camera to pick up images while panning and tilting said camera, and synthesizing image data corresponding to a maximum imaging visual field of said camera from the picked up images; and third display means for displaying the synthetic image in the first frame.

15. The device according to claim 14, wherein said synthesizing means and said third display means are initially activated.

16. The device according to claim 14, wherein said synthesizing means and said third display means are activated upon reception of a predetermined operation instruction.

17. The device according to claim 12, further comprising:
input means for inputting an image taken by said camera; and image display means for displaying the input image in the second area.

18. A camera control device including control means for controlling a camera having a limiter for panning, tilting, and zooming, comprising:

first area display means for displaying a first area which is defined by said limiter of panning and tilting of said camera;

second area display means for displaying an imaging range upon initialization of said camera, as a second area, inside the first area;

first designating means for designating a movement of the displayed second area;

second designating means for designating a size of the displayed second area; and area display updating means for updating the display of the second area in accordance with the contents designated by said first or second designating means;

wherein said control means controls an imaging direction or a zoom ratio of said camera in accordance with the designated contents by said first or second designating means.

19. The device according to claim 18, wherein said first and second designating means are pointing devices.

20. The device according to claim 18, further comprising:
synthesizing means for repeatedly causing said camera to pick up images while panning and tilting said camera, and synthesizing image data corresponding to a maximum imaging visual field of said camera from the picked up images; and third display means for displaying the synthetic image in the first frame.

21. The device according to claim 20, wherein said synthesizing means and said third display means are initially activated.

22. The device according to claim 20, wherein said synthesizing means and said third display means are activated upon reception of a predetermined operation instruction.

23. The device according to claim 20, further comprising:
input means for inputting an image taken by said camera; and image display means for displaying the input image in the second frame.

24. A camera control device, comprising:
control means for controlling a camera capable of at least one of panning and tilting; and display means for displaying a first area which maximum visual field is defined by limit of movement of at least one of panning and tilting and which is larger than a current image range of the camera, and a second area which indicates the current imaging range and direction of the camera and which overlaps the first area.

25. The device according to claim 24, further comprising:
operating means for operating the second area displayed by said display means;

wherein said control means controls said camera in accordance with the position of the second area operated by said operating means.

26. The device according to claim 24, further comprising:
means for inputting an image which can be sensed as defined by the limits of at least one of panning and tilting at a predetermined timing, and displaying the input image in the first area.

27. The device according to claim 26, wherein the predetermined timing is when camera control is started.

28. The device according to claim 26, wherein the predetermined timing is when an operator inputs a specific instruction.

29. The device according to claim 26, wherein the predetermined timing is when a camera operation input is determined.

30. The device according to claim 24, wherein camera comprises an externally controllable zoom function, and
said display means displays the first area which is defined by the limits of panning and tilting and a wide-angle end of zooming, and the second area which indicates a current imaging range inside the first area and having a position and a size corresponding to current panning, tilting, and zooming conditions.

31. The device according to claim 24, further comprising:
operating means for operating area set inside and/or in the vicinity of the second area displayed said display means;

wherein said control means updates the display of the second area and controls said camera in accordance with the operation by said operating means.

32. The device according to claim 31, wherein said control means updates the display position of the second area and controls said camera in accordance with a predetermined operation by the pointing device started from inside the camera operation area by said operating means.

33. The device according to claim 32, wherein the predetermined operation by the pointing device is a drag operation by a mouse.

34. The device according to claim 31, wherein said control means updates the display size of the second area and controls said camera in accordance with a predetermined drag operation started from inside the camera operation area by said operating means.

35. A display device according to claim 24, wherein the first frame indicates the position of the picking up optical axis at the limits of panning and tilting.

36. A display device according to claim 24, wherein the first frame indicates maximum visual field at the limits of panning and tilting.

37. A control device connecting control means for controlling a camera capable of panning and tilting, comprising:
- first area display means for displaying a first area which maximum visual field is defined by the limits of panning and tilting and which exceeds a current imaging range of said camera;
- second area display means for displaying an imaging visual field upon initialization of said camera, as a second area, inside the first area;
- designating means for designating a movement of the displayed second area; and
- area display updating means for updating the display of the second area in accordance with the contents designated by said designating means;
- wherein said control means controls an imaging direction of said camera in accordance with the designated contents by said designating means.

38. The device according to claim 37, wherein said designating means is a pointing device.

39. The device according to claim 37, further comprising:
- input means for inputting an image taken by said camera; and
- image display means for displaying the input image in the second area.

40. A camera control device including control means for controlling a camera capable of panning, tilting, and zooming, comprising:
- first area display means for displaying a first area which is defined by the limits of panning and titling and which exceeds a current imaging range of the camera;
- second area display means for displaying an image range upon initialization of said camera, as a second area, inside the first area;
- first designating means for designating a movement of the displayed second area;
- second designating means for designating a size of the displayed second area; and
- area display updating means for updating the display of the second area in accordance with the contents designated by said first or second designating means;
- wherein said control means controls an imaging direction or a zoom ratio of said camera in accordance with the designated contents by said first or second designating means.

41. A camera control method including a control means for controlling a camera having a limiter for panning, tilting, and zooming, comprising:
- a first area displaying step of displaying a first area which is defined by said limiter of panning and tilting of said camera;
- a second area displaying step of displaying an image range upon initialization of said camera, as a second area, inside the first area;
- a first designating step of designating a movement of the displayed second area;
- a second designating step of designating a size of the displayed second area; and
- a frame display updating step of updating the display of the second area in accordance with the contents designated in said first or second designating step;
- wherein said control means controls an imaging direction or a zoom ratio of said camera in accordance with the contents designated said first or second designating step.

42. A camera control method for controlling a sensing direction and a field of view of a camera, comprising:
- a displaying step of displaying a first area which maximum visual field is defined by the mechanical-capable limits of at least one of panning and tilting and which exceeds a sensing range of the camera, and a second area which indicates a current imaging range at a position inside the first area;
- a designating step of designating a position and a size of the second area displayed in said first area;
- a control step controlling the sensing direction and the field of view of said camera in accordance with the contents designated in said designating step.

43. A display method for displaying current imaging conditions of a camera which is controlled by at least one of panning and tilting, comprising:
- a displaying step of displaying a first area which maximum visual field is defined by limit of movement of at least one of panning and tilting of the camera and which exceeds a current imaging range of the camera, and a second area which indicates the current imaging range and direction of the camera and which overlaps the first area.

44. A display device connected with control means for controlling a camera capable of at least one of panning and tilting, comprising:
- display means for displaying an area which maximum visual field is defined by limit of movement of at least one of panning and tilting and which exceeds a current image range of the camera, and an indication which indicates the current imaging direction of the camera at a position inside the area.

* * * * *